US012745138B2

(12) United States Patent
Maattanen et al.

(10) Patent No.: US 12,745,138 B2
(45) Date of Patent: Sep. 22, 2026

(54) METHODS AND DEVICES FOR MOVING FROM FIRST CELL TO SECOND CELL

(71) Applicant: Telefonaktiebolaget LM Ericsson (publ), Stockholm (SE)

(72) Inventors: Helka-Liina Maattanen, Espoo (FI); Johan Rune, Lidingo (SE); Emre Yavuz, Stockholm (SE); Zhipeng Lin, Nanjing Jiangsu (CN); Olof Liberg, Enskede (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 422 days.

(21) Appl. No.: 18/267,376

(22) PCT Filed: Dec. 14, 2021

(86) PCT No.: PCT/IB2021/061727

§ 371 (c)(1),
(2) Date: Jun. 14, 2023

(87) PCT Pub. No.: WO2022/130217

PCT Pub. Date: Jun. 23, 2022

(65) Prior Publication Data

US 2024/0064583 A1 Feb. 22, 2024

(30) Foreign Application Priority Data

Dec. 14, 2020 (WO) ................ PCT/CN2020/136278

(51) Int. Cl.
*H04W 36/00* (2009.01)
*H04W 36/08* (2009.01)

(52) U.S. Cl.
CPC .................. *H04W 36/0061* (2013.01); *H04W 36/0072* (2013.01); *H04W 36/08* (2013.01)

(58) Field of Classification Search
CPC ......... H04W 36/0061; H04W 36/0072; H04W 36/08; H04W 56/0045; H04W 84/06; H04B 7/18541; H04B 7/1851
See application file for complete search history.

(56) References Cited

U.S. PATENT DOCUMENTS

2019/0037338 A1 1/2019 Edge
2019/0222303 A1 7/2019 Lucky
(Continued)

FOREIGN PATENT DOCUMENTS

WO 2020047808 A1 3/2020

OTHER PUBLICATIONS

3GPP TR 38.811 V15.4.0, 3GPP, "3rd Generation Partnership Project; Technical Specification Group Radio Access Network; Study on New Radio (NR) to support non-terrestrial networks (Release 15)", Sep. 2020.
(Continued)

*Primary Examiner* — Steven Hieu D Nguyen
(74) *Attorney, Agent, or Firm* — FBT Gibbons LLP

(57) ABSTRACT

Methods and systems are described for assisting a user equipment in moving from a first cell to a second cell in a telecommunications system. Embodiments include triggering the sending of ephemeris data, or other data, in a neighboring cell into which a user equipment is moving. The user equipment can send, while in a first cell, a request for triggering broadcast of data in the neighboring cell, according to configuration information. The user equipment can then enter the neighboring cell and receive the data.

18 Claims, 19 Drawing Sheets

(56) References Cited

U.S. PATENT DOCUMENTS

| | | | | |
|---|---|---|---|---|
| 2019/0253956 | A1* | 8/2019 | Fujishiro | H04W 48/16 |
| 2019/0306784 | A1* | 10/2019 | Chen | H04W 48/14 |
| 2020/0045674 | A1 | 2/2020 | Tseng | |
| 2020/0178135 | A1* | 6/2020 | Yun | H04W 36/0061 |
| 2021/0105761 | A1* | 4/2021 | Cheng | H04L 5/0053 |
| 2021/0360514 | A1* | 11/2021 | Yang | H04W 48/10 |
| 2023/0362857 | A1* | 11/2023 | Ghanbarinejad | H04W 56/0045 |

OTHER PUBLICATIONS

3GPP, "3rd Generation Partnership Project; Technical Specification Group Radio Access Network; Solutions for NR to support non-terrestrial networks (NTN) (Release 16)", TR 38.821 V16.0.0, Dec. 2019.

Lenovo, Motorola Mobility, "Ephemeris data provision in NTN". R2-2009862 (Revision of R2-2007473), 3GPP TSG-RAN WG2 Meeting #112 electronic Online, Nov. 2-13, 2020.

Thales, Study on solutions evaluation for NR to support Non Terrestrial Network, 3GPP TSG RAN meeting #80, RP-181370, Jun. 11-14, 2018, La Jolla, USA.

European Search Report for Application No. EP 21831117.3 dated Feb. 4, 2026.

* cited by examiner

*SI-SchedulingInfo* Information Element

```
-- ASN1START
-- TAG-SI-SCHEDULINGINFO-START

SI-SchedulingInfo: :=          SEQUENCE {
   schedulingInfoList             SEQUENCE  (SIZE(1..maxSI-Message)) OF SchedulingInfo,
   si-WindowLength                ENUMERATED {s5, s10, s20, s40, s80, s160, s320, s640,
                                             s1280},
   si-RequestConfig               SI-RequestConfig       OPTIONAL,-- Cond MSG-1
   si-RequestConfigSUL            SI-RequestConfig       OPTIONAL,-- CondSUL-MSG-1
   systemInformationAreaID        BIT STRING(SIZE(24))   OPTIONAL,-- NeedR
   ...
}

SchedulingInfo::=              SEQUENCE {
   si-BroadcastStatus             ENUMERATED {broadcasting, notBroadcasting},
   si-Periodicity                 ENUMERATED {rf8, rf16,   32, rf64, rf128, rf256,
                                             rf512},
   sibMappingInfo                 SIB-Mapping
}

SIB-Mapping: :=                SEQUENCE (SIZE(1..maxSIB)) OF SIB-TypeInfo

SIB-TypeInfo: :=               SEQUENCE {
   type                           ENUMERATED {sibType2, sibType3, sibType4, sibType5,
                                            sibType6, sibType7, sibType8, sibType9,
                                            sibType10-v1610, sibType10-v1611,
                                            sibType12-v1610, sibType13-v1610,
                                            sibType14-v1610,
                                            spare3, spare2, spare1...},

   valueTag                       INTEGER(0..31)         OPTIONAL,-- CondSIB-TYPE
   areaScope                      ENUMERATED {true}      OPTIONAL-- NeedS
}

-- TAG-SI-SCHEDULINGINFO-STOP
-- ASN1STOP
```

FIG. 3

| SchedulingInfo field descriptions |
| --- |
| areaScope<br>Indicates that a SIB is area specific. If the field is absent, the SIB is cell specific. |
| si-BroadcastStatus<br>Indicates if the SI message is being broadcasted or not. Change of si-BroadcastStatus should not result in system information change notifications in Short Message transmitted with P-RNTI over DCI (see clause 6.5). The value of the indication is valid until the end of the BCCH modification period when set to broadcasting. |
| si-Periodicity<br>Periodicity of the SI-message in radio frames. Value rf8 corresponds to 8 radio frames, value rf16 corresponds to 16 radio frames, and so on. |

| SI-RequestResources field descriptions |
| --- |
| ra-AssociationPeriodIndex<br>Index of the association period in the si-RequestPeriod in which the UE can send the SI request for SI message(s) corresponding to this SI-RequestResources, using the preambles indicated by ra-PreambleStartIndex and rach occasions indicated by ra-ssb-OccasionMaskIndex. |
| ra-PreambleStartIndex<br>If N SSBs are associated with a RACH occasion, where N > = 1, for the i-th SSB (i=0, ..., N-1) the preamble with preamble index = ra-PreambleStartIndex + i is used for SI request; For N < 1, the preamble with preamble index = ra-PreambleStartIndex is used for SI request. |

FIG. 4A

| SI-SchedulingInfo field descriptions |
|---|
| si-RequestConfig<br>Configuration of Msg1 resources that the UE uses for requesting SI-messages for which si-BroadcastStatus is set to notBroadcasting. |
| si-RequestConfigSUL<br>Configuration of Msg1 resources that the UE uses for requesting SI-messages for which si-BroadcastStatus is set to notBroadcasting. |
| si-WindowLength<br>The length of the SI scheduling window. Value s5 corresponds to 5 slots, value s10 corresponds to 10 slots and so on. The network always configures si-WindowLength to be shorter than or equal to the si-Periodicity. |
| systemInformationAreaID<br>Indicates the system information area that the cell belongs to, if any. Any SIB with areaScope within the SI is considered to belong to this systemInformationAreaID. The systemInformationAreaID is unique within a PLMN. |

| Conditional presence | Explanation |
|---|---|
| MSG-1 | The field is optionally present, Need R, if si-BroadcastStatus is set to notBroadcasting for any SI-message included in SchedulingInfo. It is absent otherwise. |
| SIB-TYPE | The field is mandatory present if the SIB type is different from SIB6, SIB7 or SIB8. For SIB6, SIB7 and SIB8 it is absent. |
| SUL-MSG-1 | The field is optionally present, Need R, if this serving cell is configured with a supplementary uplink and if si-BroadcastStatus is set to notBroadcasting for any SI-message included in SchedulingInfo. It is absent otherwise. |

METHODS AND DEVICES FOR MOVING FROM FIRST CELL TO SECOND CELL

CROSS REFERENCE TO RELATED INFORMATION

This application is a national-phase entry under 35 USC § 371 of International Application No. PCT/IB2021/061727, filed Dec. 14, 2021, titled "Methods and Devices for Moving from First Cell to Second Cell"; This application which claims the benefit of Patent Cooperation Treaty priority application No. PCT/CN2020/136278, filed Dec. 14, 2020, titled "Methods and Devices for Moving from First Cell to Second Cell," the contents of which are hereby incorporated herein in its entirety.

TECHNICAL FIELD

The present disclosure generally relates to the technical field of wireless communications.

BACKGROUND

Under the 3rd Generation Partnership (3GPP) 5th-Generation (5G)/New Radio (NR) background, in 3GPP Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality since Release 13 Narrow Band (NB)-Internet of Things (IoT) and LTE-Machine to Machine (LTE-M) are part of the LTE specifications and provide connectivity to massive machine type communications (mMTC) services.

In 3GPP Release 15, the first release of the 5G system (5GS) was specified. This is a new generation's radio access technology intended to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the LTE specification, and to that add needed components when motivated by the new use cases.

In Release 15, 3GPP also started the work to prepare NR for operation in a Non-Terrestrial Network (NTN). The work was performed within the study item "NR to support Non-Terrestrial Networks" and resulted in TR 38.811. In Release 16, 3GPP started the work to prepare NR for operation in an NTN network continued with the study item "Solutions for NR to support Non-Terrestrial Network", with the results documented in TR 38.821. In parallel the interest to adapt LTE for operation in NTN is growing. As a consequence, 3GPP is considering introducing support for NTN in both LTE and NR in Release 17.

A satellite radio access network usually includes the following components: a satellite that refers to a space-borne platform; an earth-based gateway that connects the satellite to a base station or a core network, depending on the choice of architecture; a feeder link that refers to the link between a gateway and a satellite; and an access link (also referred to as service link) that refers to the link between a satellite and a UE (user equipment).

Depending on the orbit altitude, a satellite may be categorized as low earth orbit (LEO), medium earth orbit (MEO), or geostationary earth orbit (GEO) satellite:

LEO: typical heights ranging from 250-1,500 km, with orbital periods ranging from 90-120 minutes.

MEO: typical heights ranging from 5,000-25,000 km, with orbital periods ranging from 3-15 hours.

GEO: height at about 35,786 km, with an orbital period of 24 hours.

The significant orbit height means that satellite systems are characterized by a path loss that is significantly higher than what is expected in terrestrial networks. To overcome the path loss, it is often required that the access and feeder links are operated in line-of-sight conditions, and that the UE is equipped with an antenna offering high beam directivity.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement (referred to as the moving-beam cell case/deployment) or may be earth-fixed with some beam pointing mechanism used by the satellite to compensate for its motion (referred to as the earth-fixed beam case/deployment). The size of a spotbeam depends on the system design, which may range from tens of kilometers to a few thousands of kilometers.

Two basic architectures have been considered: transparent payload and regenerative payload. In transparent systems (also called bent pipe architecture), the next generation NodeB (gNB) is located on the ground and the satellite forwards signals/data between the gNB and the UE. In regenerative systems the gNB is located in the satellite. In the work item for NR NTN in 3GPP release 17, only the transparent architecture is considered.

FIG. 1 shows an example architecture of a satellite network 50 with bent pipe transponders. Satellite 13 provides telecommunication capabilities for UEs such as device 9. Satellite 13 may serve one or more of spotbeams 1, 2, 3, 4. Other satellites, such as satellite 17 may serve one or more spotbeams 1, 2, 3, 4. Base station 16 can be collocated with gateway 15. Satellite 13 communicates with gateway 15 over feeder link 11 and with device 9 over access link 12. As will be described further below, device 9 may be moving from one spotbeam (e.g., spotbeam 4) to another (e.g., spotbeam 1). In such a case, the neighboring spotbeam 1 may be served by the same satellite 13, or by a different satellite 17. Embodiments under the present disclosure includes methods and systems for triggering satellite serving spotbeam 1 to send ephemeris data, or other data, such that when device 9 arrives in the new spotbeam 1 then it will receive the sent data.

The NTN beam may in comparison to the beams observed in a terrestrial network be very wide and cover an area outside of the area defined by the served cell. Beams covering adjacent cells can overlap and cause significant levels of intercell interference. To overcome the large levels of interference, a typical approach in a NTN is to configure different cells with different carrier frequencies and polarization modes.

In TR 38.821, it has been captured that ephemeris data should be provided to the UE, for example to assist with pointing a directional antenna (or an antenna beam) towards the satellite, and to calculate a correct Timing Advance (TA) and Doppler shift (which, when derived autonomously by the UE, are also respectively referred to as time and frequency pre-compensation). Procedures for how to provide and update ephemeris data have not yet been studied in detail.

A satellite orbit can be fully described using six parameters. Exactly which set of parameters are chosen can be decided by the user; many different representations are possible. For example, a choice of parameters used often in astronomy is the set (a, ε, i, Ω, ω, t). Here, the semi-major axis a, and the eccentricity ε, describe the shape and size of the orbit ellipse; the inclination i, the right ascension of the ascending node Ω, and the argument of periapsis ω determine its position in space, and the epoch t determines a reference time (e.g., the time when the satellite moves through periapsis). This set of parameters, referred to as orbital elements, are illustrated in FIG. 2.

As an example of a different parametrization, the Two-Line Element (TLE) set format uses mean motion n and mean anomaly M instead of a and t. A completely different set of parameters is the position and velocity vector (x, y, z, vx, vy, vz) of a satellite. These are sometimes called orbital state vectors. They can be derived from the orbital elements and vice versa, since the information they contain is equivalent. All these formats (and many others) are possible choices for the format of ephemeris data to be used in NTN. To enable further progress, the format of the data should be agreed upon by the parties involved in any given network.

Another aspect discussed during the study item and captured in TR 38.821, is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently. The update frequency depends on the satellite and its orbit and ranges from weekly to multiple times per day for satellites on very low orbits which are exposed to strong atmospheric drag and need to perform correctional maneuvers often.

So, while it seems possible to provide the satellite position with the required accuracy, care needs to be taken to meet these requirements, e.g., when choosing the ephemeris data format, or the orbital model to be used for the orbital propagation, as well as when considering how often to update the provided ephemeris data.

System information (SI) is an important function in cellular communication systems. It provides UEs with the information needed to access the network and to perform other functions, such as reselecting between cells and receiving Multimedia Broadcast Multicast Service (MBMS) transmissions in a cellular network operating in accordance with a 3GPP standard. In addition, in 3GPP cellular systems, the SI mechanism is used for conveying Public Warning System messages, such as Earthquake and Tsunami Warning System (ETWS) messages and Commercial Mobile Alert System (CMAS). In LTE, the SI is provided using periodic broadcasting in each cell. The SI is divided into a Master Information Block (MIB) and a number of System Information Blocks (SIBs). The MIB and SIB1 are broadcast with periods that are fixed in the standard. The other SIBs are broadcast with different periods, as configured in SIB1.

For the 5G system referred to as New Radio (NR) (where the RAN is referred to as Next Generation Radio Access Network (NG-RAN) and the core network is referred to as Next Generation Core (NGC)), 3GPP has partly changed the principles for distribution of system information (SI) that are used in LTE. For NR, the SI is divided into "minimum SI" and "other SI", where the minimum SI is the SI that is required to access the cell, and, in the case of NR standalone mode (i.e., not in dual connection configuration with LTE), the minimum SI also contains scheduling information for the SIBs of the other SI. The minimum SI comprises the Master Information Block (MIB) and System Information Block type 1 (SIB1). SIB1 is also referred to as "Remaining Minimum System Information" (RMSI). At least in NR stand-alone mode, the minimum SI is periodically broadcast in a cell, while the other SI may be either periodically broadcast or delivered on-demand, triggered by a request from a UE. The granularity of the division into periodically broadcast SI and on-demand SI is on the level of SI messages. Whether a certain SI message is periodically broadcast or provided on-demand is indicated in SIB1 (e.g., using the si-BroadcastStatus parameter). A UE in RRC_IDLE, RRC_INACTIVE or RRC_CONNECTED state can request an on-demand SI message either using a random-access preamble (referred to as the Msg1 based method) or using a random-access message 3 (referred to as the Msg3 based method). If random access preamble (Msg1) transmissions are used, there may be different preambles for requesting different SI message(s) (and consequently the SIB(s) allocated to the SI message(s)) of the other SI. The mapping between a random-access preamble and the SI message to be requested is configured in SIB1. If random access message 3 (Msg3) transmissions are used, a UE may in such a message specify which SI message(s) (and consequently the SIB(s) allocated to the SI message(s)) of the other SI the UE wants the network to broadcast/transmit. A request for an on-demand SI message triggers the network to broadcast the requested SI message for a limited time in accordance with the scheduling information associated with the concerned SI message in SIB1. The network will also transmit an acknowledgement message to the requesting UE. For the Msg1 based request method, the network responds with an acknowledging random-access message 2 (Msg2). For the Msg3 based requests method, the network responds with an acknowledging random-access message 4 (Msg4).

Periodic broadcast of SI is designed mostly according to the same principles in NR as in LTE. Similar to LTE, the Master Information Block (MIB) is transmitted in a fixed location in relation to the synchronization signals. The situation for SIB1 is slightly different in NR than in LTE. The periodicity of SIB1 is 160 ms, but it may be repeated a number of times within these 160 ms and the transmission configuration is indicated in the MIB. The remaining SIBs are scheduled in SIB1 and transmitted on the Physical Downlink Shared Channel (PDSCH) in the same way as in LTE. Different SIBs can have different periodicities. SIBs with the same periodicity are allocated to the same SI message and every SI message is associated with a periodic SI-window within which the SI message should be transmitted. The SI-windows of the different SI messages have different periodicities, are non-overlapping and they all have the same duration. It is noted that the exact transmission occasion of an SI message is not configured, only the window within which it will be transmitted. To indicate that a PDSCH transmission contains an SI message, the Cycle Redundancy Check (CRC) of the Physical Downlink Control Channel (PDCCH) scheduling Downlink Control Information (DCI) which allocates the PDSCH transmission resources is scrambled with the System Information-Radio Network Temporary Identifier (SI-RNTI). A receiving UE leverages the non-overlapping property of the SI-windows to identify which SI message it receives (and hence which SIBs the SI message contains), the SI messages in themselves do not have any indication to distinguish one SI message from the other. The principle of allocating SIBs to SI messages and scheduling of SI messages in SI-windows is illustrated in FIG. 4. Each SI message is transmitted in its own SI-window, whose occurrence in time depends on the SI message periodicity and the SI message's position in the list in SIB1.

Note that every SI message has a configured schedule, irrespective of whether it is periodically broadcast or provided on-demand. In the latter case, the scheduled broadcast occasions are utilized only when the network, i.e., gNB, has received a request for the concerned SI message.

FIGS. 3 and 4A-4B display the ASN.1 definitions of the SI scheduling related parameters in SIB1 and associated field descriptions.

The basic principles for SI updates are the same in NR as in LTE. It is built around the concept of SI modification periods. With some exceptions, SI can only be updated at the border between two SI modification periods. Furthermore, a planned SI update has to be announced in the SI modification period prior to an actual SI update. Such announcements are performed using the paging mechanism, i.e., a notification on the paging channel is used to inform UEs in RRC_IDLE, UEs in RRC_INACTIVE and UEs in RRC_CONNECTED state about a coming system information change. In NR, notifications of coming SI updates are conveyed via so-called "Short Messages", i.e., included in the DCI (with the CRC scrambled with the P-RNTI) on the PDCCH, with or without an associated scheduled Paging message on the PDSCH. If the UE receives a DCI containing a Short Message including a systemInfoModification indication, it knows that the system information will change at the next SI modification period boundary.

A special case of SI update notification via a Short Message on the paging channel is when an etwsAndCmasIndication parameter in the Short Message indicates that a public warning system message (ETWS or CMAS) has been activated (or changed) in the SI. In this case, the UE knows that the update is applicable immediately and the UE should as soon as possible acquire and read the SIB(s) related to the concerned public warning. The UE has to read SIB1 to find out whether the notification concerns ETWS or CMAS.

SI updates are thus notified via the paging channel and consequently UEs have to monitor the paging channel, not only to receive paging targeting themselves, but also to receive possible SI update notifications (including PWS notifications). UEs in RRC_IDLE and RRC_INACTIVE state can monitor their regular paging occasions (POs), i.e., one per paging DRX cycle, and UEs in RRC_CONNECTED state can monitor any PO for SI update notifications, but should monitor at least one PO per default paging cycle (indicated by the defaultPagingCycle parameter in SIB1).

SUMMARY

One embodiment under the present disclosure comprises a method performed by a user equipment (UE), for moving from a first cell to a second cell, wherein the first cell is a serving cell of the UE, and the second cell comprises one of one or more neighbor cells. The method can comprise transmitting, in the first cell, a request for triggering broadcast of information data in the second cell according to configuration information prior to moving from the first cell to the second cell; and receiving the information data broadcast in the second cell.

Another embodiment can comprise a method performed by a first network node for moving a UE from a first cell associated with the first network node to a second cell, wherein the first cell is a serving cell for the UE. The method can comprise receiving from the UE, in the first cell, a request for triggering broadcast of information data in the second cell; and determining whether the second cell is served by the first network node or a second network node. If the second cell is served by the second network node, then the request is forwarded for broadcast of the information data to the second network node. If the second cell is served by the first network node, then the requested information data is broadcasted in the second cell.

Another embodiment can comprise a method performed by a second network node for moving a UE from a first cell to a second cell associated with the second network node, wherein the first cell is a serving cell of the UE and is controlled by a first network node, wherein the second cell comprises one of one or more neighbor cells of the first cell. The method can comprise receiving, from the first network node, a request for triggering broadcast information data in the second cell. The method can further optionally comprise broadcasting the requested information data in the second cell, and/or determining whether to accept the request to broadcast the information data in the second cell.

Another embodiment can comprise a UE comprising a processor and a memory. The memory has stored thereon a computer program which when executed on the processor, causes the processor to carry out a method for moving from a first cell to a second cell, wherein the first cell is a serving cell of the UE, and the second cell comprises one of one or more neighbor cells. The method comprises transmitting to a base station associated with the first cell, while being served in the first cell, a request for triggering a broadcast of information data in the second cell according to configuration information prior to moving from the first cell to the second cell; and receiving the information data broadcast by a second base station associated with the second cell.

A further embodiment can comprise a first network node comprising a processor and a memory having stored thereon a computer program which, when executed on the processor, causes the processor to carry out a method for moving a UE from a first cell associated with the first network node to a second cell, wherein the first cell is a serving cell for the UE. The method comprises receiving from the UE, in the first cell, a request for triggering broadcast of information data in the second cell; determining whether the second cell is served by the first network node or a second network node; and if the second cell is served by the second network node, forwarding the request for broadcast of the information data to the second network node; and if the second cell is served by the first network node, broadcasting the requested information data in the second cell.

An additional embodiment can comprise a second network node comprising a processor and a memory having stored thereon a computer program which, when executed on the processor, causes the processor to carry out a method for moving a UE from a first cell to a second cell associated with the second network node, wherein the first cell is a serving cell of the UE and is controlled by a first network node, wherein the second cell comprises one of one or more neighbor cells of the first cell. The method comprises receiving, from the first network node, a request for triggering broadcast information data in the second cell.

A further embodiment can comprise non-transitory computer-readable storage medium, having stored thereon a computer program which, when executed on at least one processor, causes the at least one processor to carry out the method according to any one of the embodiments described herein.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which:

FIG. 3 shows the ASN.1 definitions of the SI scheduling related parameters in SIB1;

FIGS. 4A-4B show the field descriptions for SI related parameters in SIB1;

FIG. 9 shows a schematic flow chart of a method performed by a first network node for moving from a first cell to a second cell according to an embodiment of the present disclosure;

DETAILED DESCRIPTION

Figure 1:
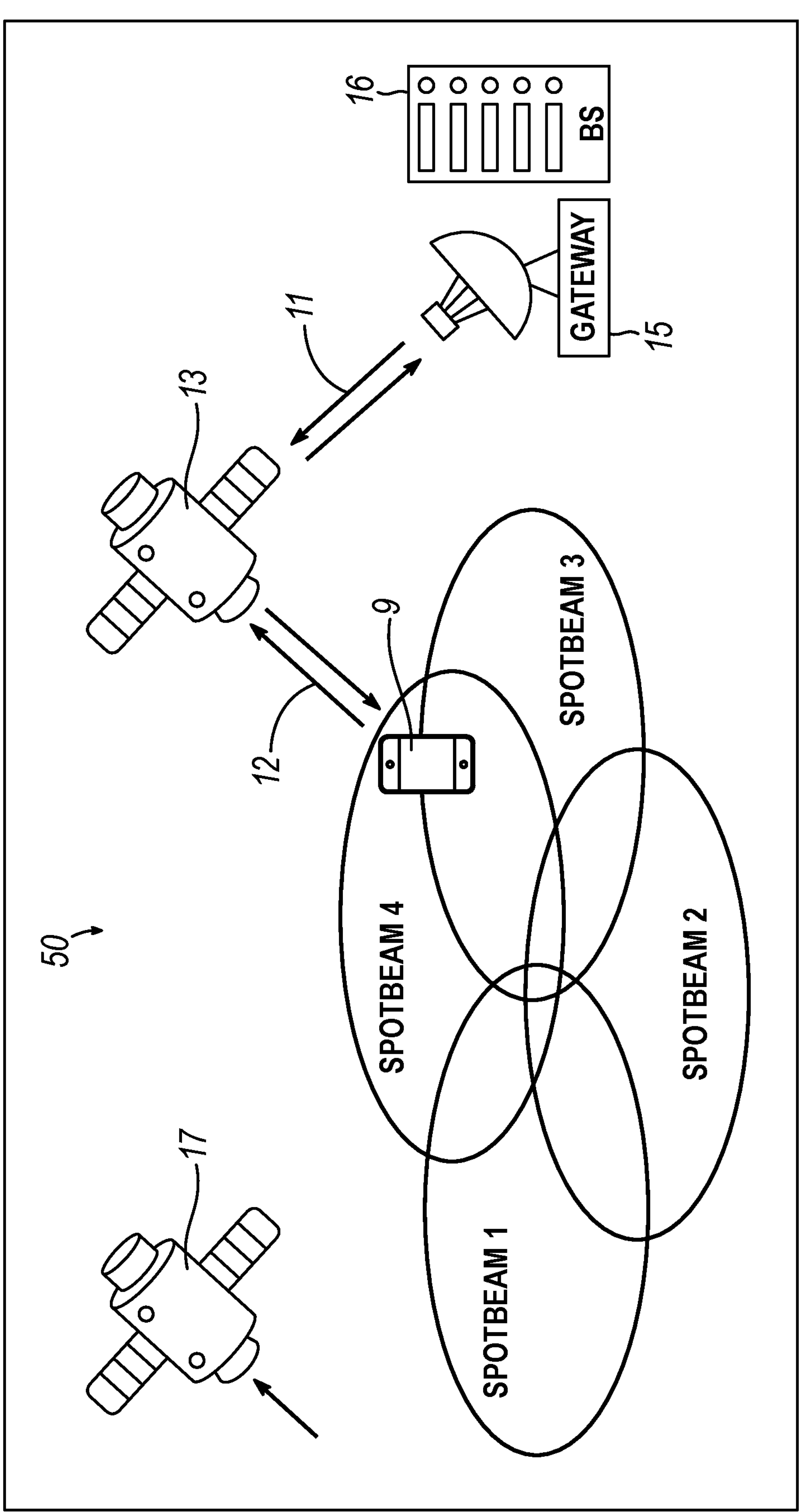
FIG. 1 shows a schematic diagram of a bent pipe satellite network architecture under the present disclosure.
Figure 2:
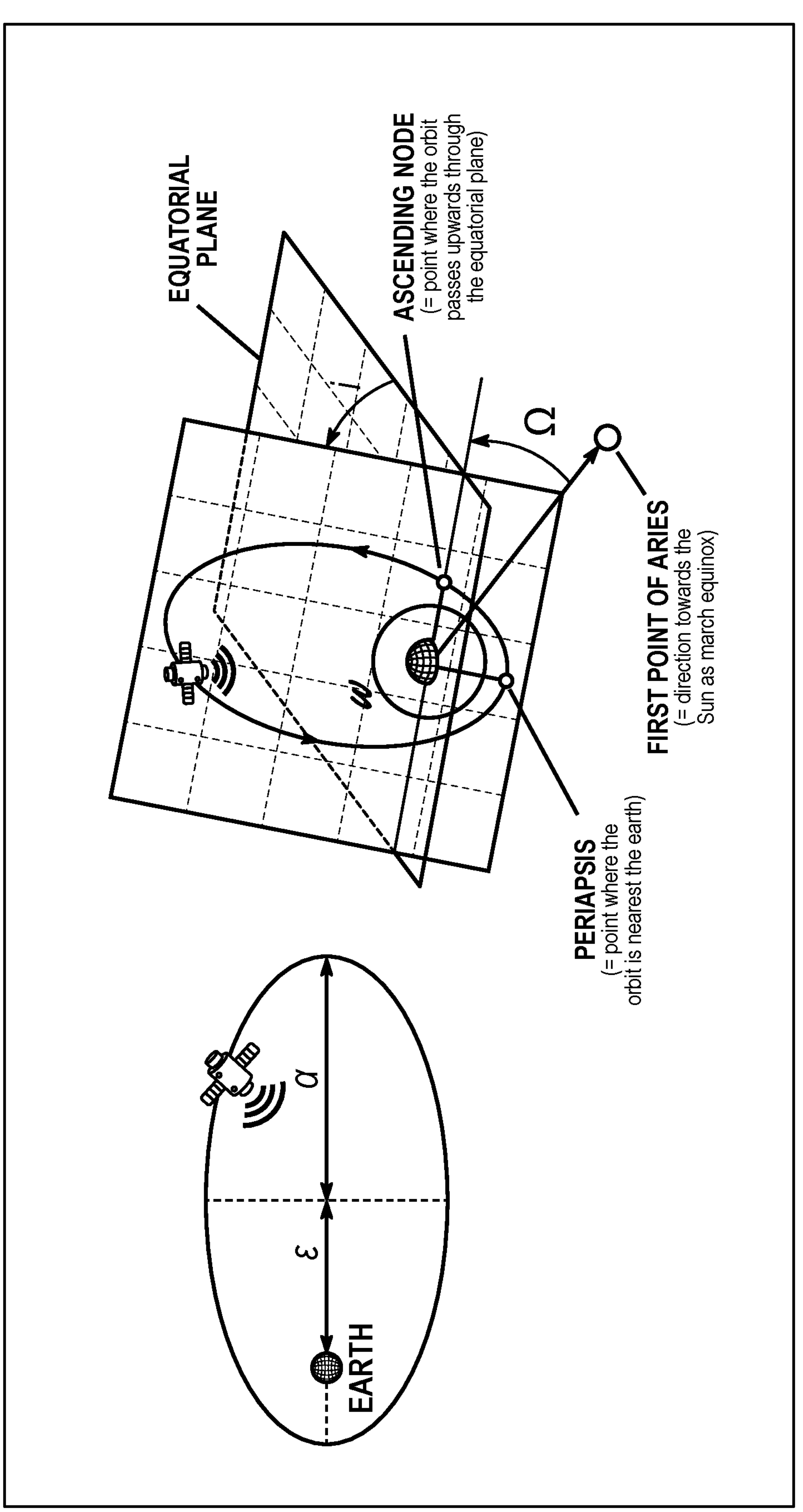
FIG. 2 shows a schematic diagram of orbital elements for describing a satellite orbit.
Figure 5:
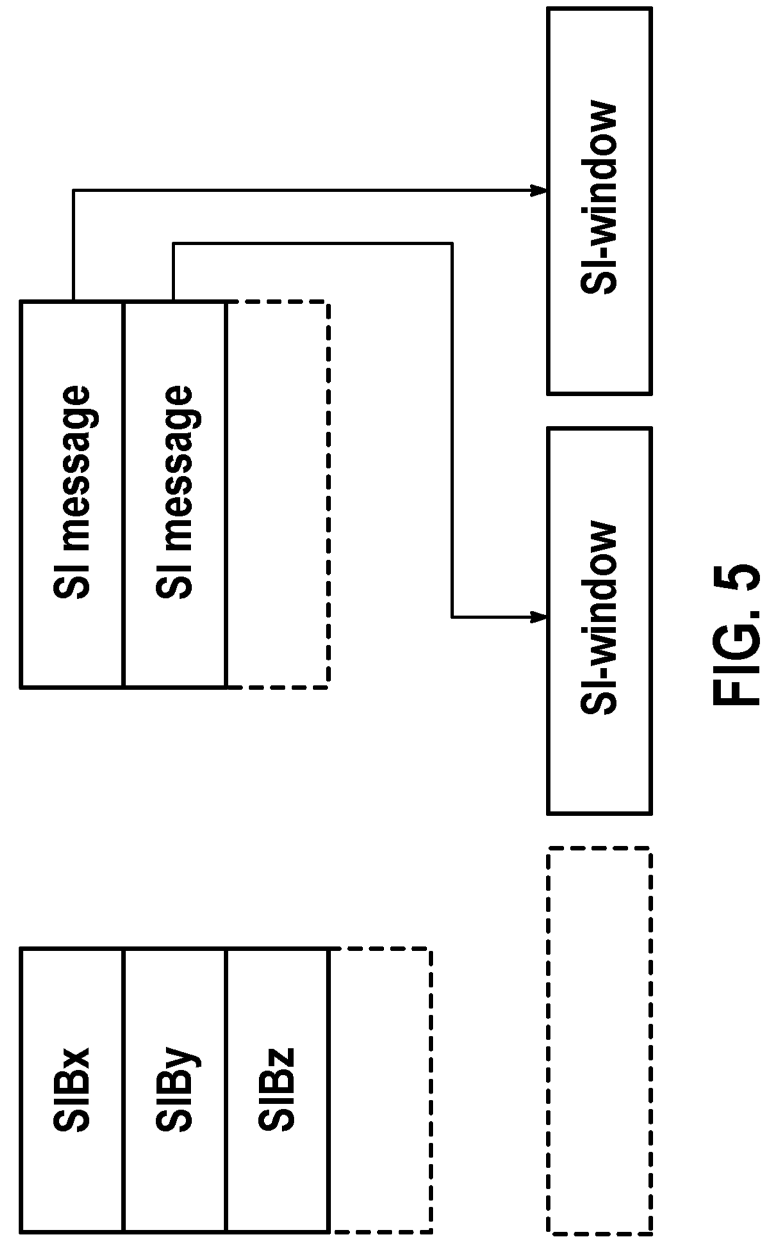
FIG. 5 shows a schematic diagram of allocating SIBs to SI messages and scheduling of SI messages in SI-windows.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

There are numerous problems with existing solutions. As can be understood from above, NTN UEs rely on access to ephemeris data for the satellites in the NTN for efficient operation. However, broadcasting of ephemeris data in the system information will cause additional control signaling overhead, especially in the moving-beam deployment case.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Since various wireless systems may benefit from exploiting the ideas covered within this disclosure as will be appreciated by those skilled in the art, terms like "base station", "user equipment", "access point" and "network node" as used herein should be understood in a broad sense. Specifically, the base station should be understood to encompass a legacy base station in a 2nd Generation (2G) network, a NodeB in a 3rd Generation (3G) network, an evolved NodeB (eNode B) in a 4th Generation (4G), a gNB in a 5th Generation (5G) or NR network or future evolved network (e.g., LTE network, LTE-Advanced (LTE-A) network etc.), and the like. The user equipment should be understood to encompass a mobile telephone, a smartphone, a wireless-enabled tablet or personal computer, a wireless machine-to-machine unit, and the like. Furthermore, in NR NTN, a UE will see cells and not necessarily satellites. In this document, the term "serving satellite" should be understood as a satellite serving (i.e., transmitting signals/data in and receiving signals/data from) a serving cell of the UE. Similarly, the term "neighbor satellite" should be understood as a satellite serving a neighbor cell. Depending on the context, a neighbor cell may be (from the UE's perspective) a cell neighboring a serving cell of the UE, or (from a satellite's perspective or the perspective of a gNB using a satellite) a neighbor cell may be a cell served by the neighbor satellite which neighbors at least one of the cells served by the satellite. (That is, from the satellite/gNB perspective, two satellites are neighbors if at least one of the cell(s) served by one of the satellites neighbors to at least one of the cell(s) served by the other satellite.)

To address the problems described above, the present disclosure includes multiple embodiments of systems and methods for situations where a UE moves from one cell to another, such as in the case of moving-beams. Proposed embodiments of the present disclosure include methods by which a UE may send a signal, or request, in its serving cell to trigger/request broadcasting of satellite ephemeris data in a neighbor cell. The ephemeris data for which broadcast is requested, should be the ephemeris data associated with the satellite serving the concerned neighbor cell. This may be useful for a UE that is about to reselect to the concerned neighbor cell or is about to be handed over to the neighbor cell, e.g., because the UE is about to execute a conditional handover to the neighbor cell. A UE can use either of the SI request methods, or another type of request, e.g., a dedicated RRC message in RRC_CONNECTED state, to request broadcast of the full ephemeris data in a neighbor cell.

If the Msg1 based SI request method is used, there may be one preamble configured for this type of request for each of a listed set of neighbor cells where the set size may be one or more cells (as in all later examples where a set is mentioned). As another option, one (dedicated) preamble is configured for each of a listed set of satellites. In this case, the satellite may be identified with some kind of identifier, or the preamble may, in the configuration information, instead be associated with a set of neighbor cells, wherein all the neighbor cells in such a set are served by the same neighbor satellite. As yet another option, one preamble may be configured for request of ephemeris data broadcast in all the neighbor cells in a listed set of neighbor cells.

As yet another option, in the case where a dedicated preamble is configured for ephemeris data request in each listed neighbor cell (except possibly neighbor cells served by the UE's current serving satellite), the configuration data in the serving cell may also indicate which of the neighbor cells that are served by the same satellite (for instance, the neighbor cells may be grouped per satellite, or each neighbor cell may have an associated satellite identifier). Another option is that an indicator, e.g., a one-bit flag, is associated with each of the listed neighbor cells, indicating whether the cell is served by the current serving satellite (i.e., the satellite serving the UE's current serving cell) or another satellite. A benefit of conveying this type of information to UEs may be that a UE which has already (e.g., recently) acquired ephemeris data in one of the neighbor cells from the information may conclude that a certain other neighbor cell is served by the same satellite and that the UE consequently can refrain from requesting ephemeris data to be broadcast in this other neighbor cell, e.g., prior to performing cell re-selection to that neighbor cell. As another option, cells served by one satellite may also be collected in subgroups in case certain broadcast information applies only to such a subgroup of cells, for example PLMN or TAI. Yet another option is that an indicator, e.g., a one-bit flag, is associated with each of the listed neighbor cells, indicating whether a dedicated preamble is to be used for that particular cell, which can implicitly group cells with respect to a serving satellite (i.e., the satellite serving the UE's current serving cell) or another satellite.

In another embodiment, a preamble configured for ephemeris data request is broadcasted in a cell via the MIB or a SIB (preferably SIB1 or SIB2), so that the UE can transmit the request once the candidate cell, e.g., to camp in or handover to, is identified. In a variant, the embodiments described above can be combined so that the UE can know in advance whether a particular cell is served by the same satellite before sending such a request.

If the Msg3 based SI request method is used, the requesting UE can indicate in the request message (in random access Msg3) which neighbor cell(s) it wants ephemeris data to be broadcast in. Optionally, the UE may also indicate details about the ephemeris data it wants to be broadcast, e.g., in terms of which parameters to broadcast, which ephemeris data format (i.e., which satellite orbit representation format/parameters) to use for the broadcast information, and/or the desired accuracy of the broadcast information. Such indications about details of the ephemeris data that is requested to be broadcast may also be included if another message than random access Msg3 is used, such as an RRC message used in RRC_CONNECTED state.

In addition to the existing Msg1 and Msg3 based SI request methods, it would be possible to use a method based on 2-step random access for request of ephemeris data broadcast in a neighbor cell. For instance, a MsgA-based SI request method could be used, wherein the request and possible details, such as the concerned cell(s), ephemeris data format and/or parameters (as described above for the case where Msg3 based SI request is used) would be included in the PUSCH part of MsgA. One scenario where a MsgA-based method could be beneficial is if only 2-step random access (i.e., no 4-step random access) is configured in the serving cell (or BWP). Another motivation for a MsgA-based method is that it saves one message roundtrip compared to a Msg3-based method, since unlike the case with a Msg3-based method, the MsgA comprises both the random-access preamble (corresponding to Msg1) and a message on the PUSCH (corresponding to Msg3) and does not require the random-access preamble (Msg1) and Random Access Response (Msg2) to be exchanged before transmitting the actual request). No MsgA-based SI request method is specified in 3GPP release 16, but such a method may be introduced in later releases of the 3GPP standard, either for NR in general or only for NR adapted for use in NTNs.

As one option, the involved gNB may introduce a short additional delay before broadcasting the requested ephemeris data, to give the UE enough time to synchronize with the downlink of the neighbor cell before the requested ephemeris data is broadcast. As one option, the size of this delay may be included in the configuration data in the serving cell which configures the ephemeris data broadcast request method and/or lists the concerned neighbor cells. As another option, if the UE uses a request/trigger method to request broadcast of ephemeris data in a neighbor cell that allows indication of additional details (e.g., the Msg3-based SI request method, a MsgA-based SI request method or another message such as an RRC message used in RRC_CONNECTED state), the UE may request such a delay, or indicate a time at which the broadcast should occur (or should preferably occur), or indicate a time interval within which the broadcast should occur (one or more times), or a number of requested broadcast repetitions and/or the frequency of broadcast repetitions (e.g., in the form of the requested repetition interval). Such indications about timing, delays, intervals, number of repetitions, etc., may thus be included in a random access Msg3, a 2-step random access MsgA (the PUSCH part) or an RRC message used in RRC_CONNECTED state.

As yet another option, after the transmission of a request for broadcast of ephemeris data in a neighbor cell, the UE can start a timer or a time window for the UE to monitor the downlink in the concerned neighbor cell for reception of the requested ephemeris data broadcast. In one variant of this option, if the timer or time window expires and the UE has not received the requested ephemeris data broadcast in the neighbor cell, the UE repeats its transmission of the request in the serving cell in order to trigger broadcast of ephemeris data in the serving cell. In another variant of this option, if the UE has not received the requested ephemeris data broadcast in the neighbor cell, the UE repeats its request message in the serving cell before the timer or time window expires, in order to be proactive and reduce the delay until the ephemeris data can be received and in order to reduce the risk that the channel quality in the serving cell deteriorates too much for successful transmission of the request (e.g., if the UE is moving from the serving cell to the neighbor cell and is about to reselect to or be handed over to the neighbor cell). Optionally, the UE's timer or time window may be matched by a corresponding timer or time window in the gNB controlling the concerned neighbor cell, wherein coordination of timing may be performed between the serving gNB and the gNB controlling the neighbor cell in conjunction with the serving gNB's, forwarding of the request to the gNB controlling the neighbor cell.

Figure 6:
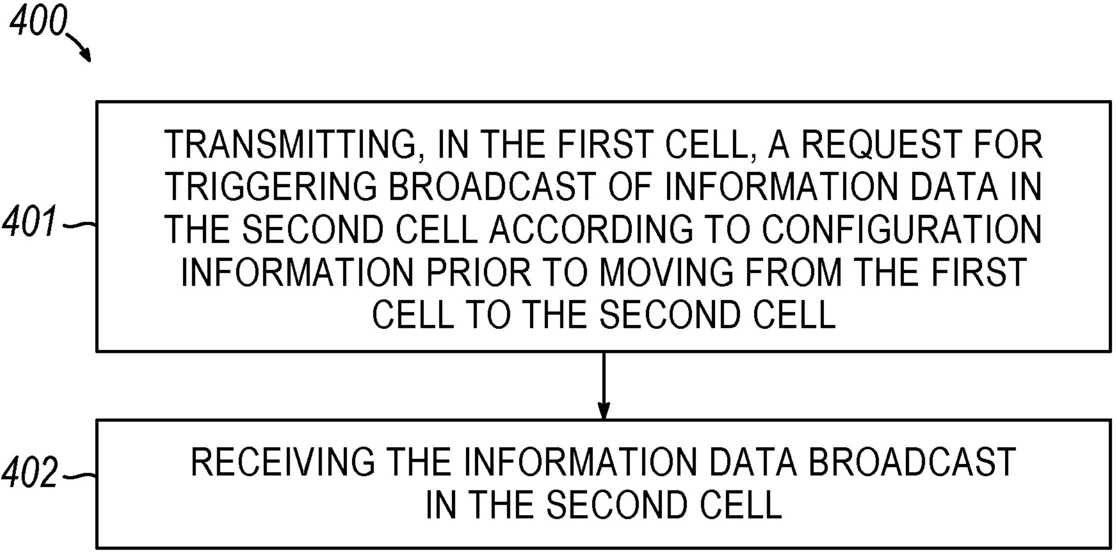
FIG. 6 shows a schematic flow chart of a method performed by a UE for moving from a first cell to a second cell according to an embodiment of the present disclosure.

FIG. 6 shows a schematic flow chart of a method 400 performed by a UE for moving from a first cell to a second cell according to a possible embodiment of the present disclosure. In the method 400, the first cell is a serving cell of the UE, and the second cell is a neighbor cell of one or more neighbor cells. The first cell and the second cell may be a cell in a NTN with earth moving-beams or in a Terrestrial network. The first cell is controlled by e.g., the first network node. The second cell is controlled by the second network node. The first network node may be a network device (e.g., gNB), in a e.g., NTN. The second network node may be another network device (e.g., gNB), in a e.g., NTN, neighboring the first network node. As an embodiment, the method 400 includes the following steps 401-402.

At step 401, prior to moving from the first cell to the second cell, the UE transmits, in the first cell, a signal (e.g., a request) for triggering broadcast of information data in the second cell according to configuration information. The configuration information may refer to configuration information from the O&M system, or from a core network node, or from a field technician, or configuration during manufacturing or customer adaptation, or as hardcoded information created during programming or product design. For example, the configuration information may be used to configure which approach should be used for triggering broadcast of information data in the second cell, to configure the resources used for one or more of the approaches, e.g., the PRACH preamble configuration for msg1 based approach, and so on. In an example, the UE may transmit a request for triggering broadcast of the information data in one or more neighbor cells by using the SI request, an ephemeris data request using a random-access preamble, or a message related to a random-access procedure, a random access Msg3, a 2-step random access MsgA and/or a dedicated RRC message request. The SI request may include one or more of an Msg1-based SI request for triggering broadcast of information data in the second cell; an Msg3-based request for triggering broadcast of information data in the second cell; or a 2-step random access-based request for triggering broadcast of information data in the second cell. For example, for the Msg1-based SI request, one or more preambles may be configured for each of a listed set of neighbor cells. Optionally, one or more preambles may be configured for each of a listed set of satellites. Optionally, one or more preambles may be configured for a set of neighbor cells served by a same satellite or served by different satellites. Additionally, which of the one or more neighbor cells are served by a same satellite may be indicated in the configuration information or by an indicator. Furthermore, one or more neighbor cells served by the same satellite may be divided into subgroups in the configuration information or by an indicator. In an example, before transmitting the request, the UE may obtain, in the first cell, the configuration information for request of broadcast of the information data in one or more neighbor cells. In an example, e.g., when the UE is in RRC_IDLE or RRC_INACTIVE state, the UE may transmit the request prior to performing cell reselection to the second cell. As another example, e.g., when the UE is in RRC_CONNECTED state, the UE may transmit the request prior to executing a handover to the second cell.

At step 402, the UE receives the information data broadcast in the second cell. The information data may be ephemeris data of a satellite broadcast via system information, SI. It can also be other types of information or system information, or other parts of the system information or a selected part of system information. The satellite ephemeris data may include orbital, position and velocity information of a satellite, and information about internodes propagation path/link, such as the feeder link (between satellite and Gateway) propagation delay and/or feeder link Doppler shift, etc. In an example, before receiving the information data, the UE may receive a response message confirming or rejecting the request; and if the response message confirming the request is received, the UE begins to monitor the downlink transmissions in the second cell for the information data. In an example, the UE may receive the satellite ephemeris data, together with "common timing advance" and/or "common Doppler shift" associated with a reference location in the second cell, broadcast in the second cell. Here, if the timing and/or frequency related information is associated with a reference location, e.g., a center location of the neighbor cell, then the associated timing and/or frequency related information may be referred as a "common timing advance" and/or a "common Doppler shift." In an example, the UE may start a timer governing a time period during which the UE have to wait until the requested information data is received. When the timer expires, the UE may retransmit the request in the first cell. Optionally, the UE may also retransmit, after a backoff time, the request in the first cell when the timer expires. The backoff time is configured for better overload and access control. As an example, the UE may calculate time and/or frequency pre-compensation to be applied to uplink transmission in the second cell by using the received information data.

Figure 7:
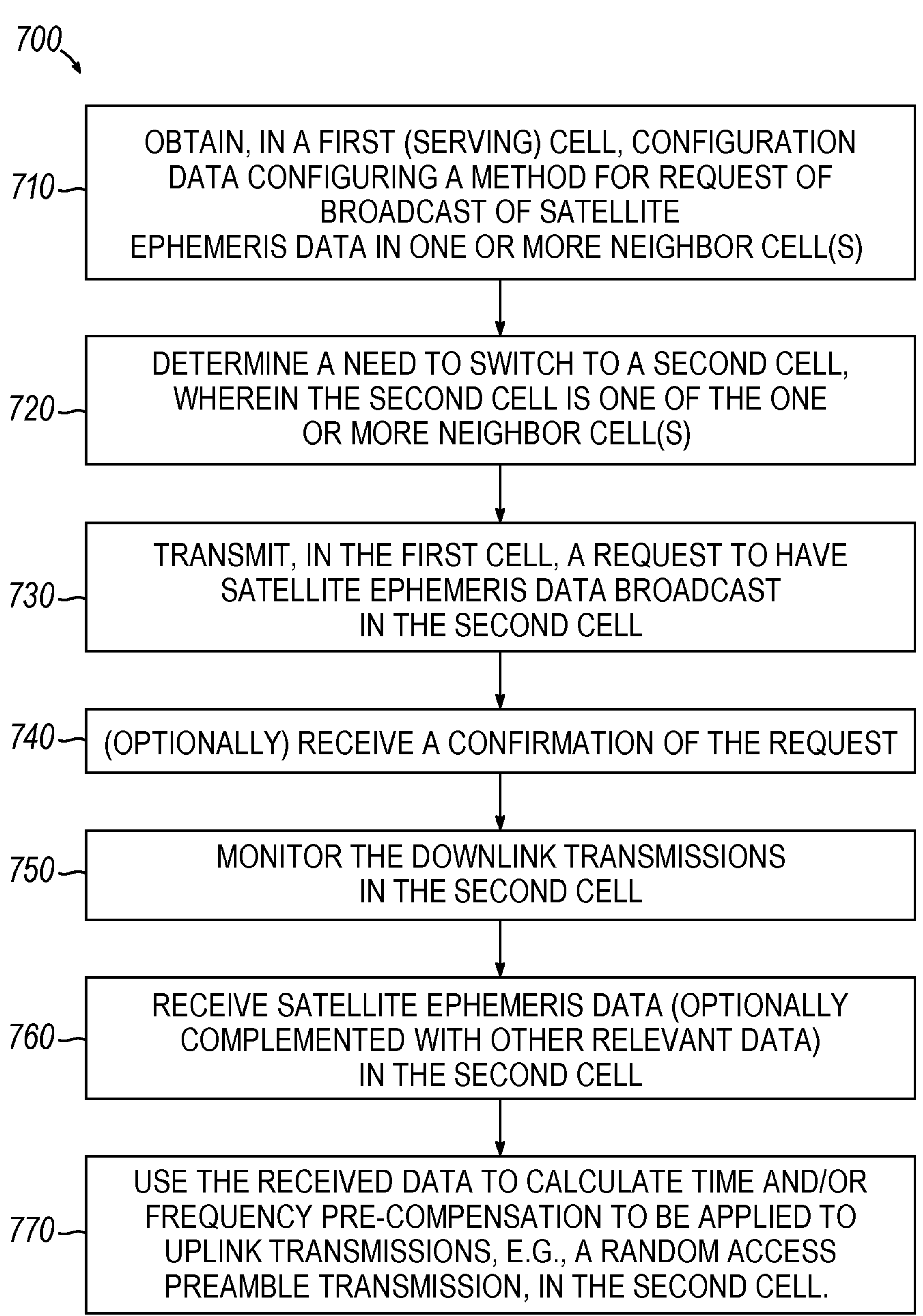
FIG. 7 shows a schematic flow chart of a method performed by a UE for moving from a first cell to a second cell according to an embodiment of the present disclosure.

FIG. 7 shows a possible embodiment of a method 700 performed by a UE being served (in RRC_IDLE, RRC_INACTIVE or RRC_CONNECTED state) by a NTN in accordance with the current disclosure. Step 710 is to obtain, in a first (serving) cell, configuration data configuring a method for request of broadcast of satellite ephemeris data in one or more neighbor cell(s). Step 720 is to determine a need to switch to a second cell, wherein the second cell is one of the one or more neighbor cell(s). Step 730 is to transmit, in the first cell, a request to have satellite ephemeris data broadcast in the second cell. Step 740 is to (optionally) receive a confirmation of the request. Step 750 is to monitor the downlink transmissions in the second cell. Step 760 is to receive satellite ephemeris data (optionally complemented with other relevant data) in the second cell. Step 770 is to use the received data to calculate time and/or frequency pre-compensation to be applied to uplink transmissions, e.g., a random-access preamble transmission, in the second cell. In step 730, the UE may optionally start a timer governing how long the UE at most expects to have to wait until it receives the requested satellite ephemeris data in the second cell, wherein expiration of the timer may trigger the UE to retransmit a request in the first (serving) cell.

On the network side, the involved nodes ensure that a request for ephemeris data broadcast is conveyed to the node responsible for performing the broadcast. A corresponding acknowledgement (or negative acknowledgement, e.g., rejection of the request) may also be returned from the node responsible for performing the broadcast and the acknowledgement (or negative acknowledgement) may be forwarded all the way to the requesting UE. This may involve inter-satellite links, e.g., in the case of the regenerative payload deployment architecture, where the Xn (inter-gNB) interface is carried on inter-satellite links. It may also involve terrestrial links, e.g., inter-gNB links, e.g., in the transparent payload deployment architecture, where the Xn (inter-gNB) interface is carried on terrestrial transport network links. Some potential inter-node paths include:

- Serving satellite→(GW)→(terrestrial) gNB→(GW)→neighbor satellite;
- Serving satellite→(GW)→(terrestrial) gNB→(terrestrial) gNB→(GW)→neighbor satellite;
- Serving satellite→(GW)→(terrestrial) gNB (where the gNB is responsible for broadcasting ephemeris data via another cell, possibly via another satellite);
- Serving satellite→(GW)→(terrestrial) gNB→(terrestrial) gNB (where the gNB is responsible for broadcasting ephemeris data via another cell, possibly via another satellite);
- Serving satellite (with DU onboard)→(GW)→(terrestrial) CU→(GW)→neighbor satellite (with DU onboard);
- Serving satellite (with DU onboard)→(GW)→(terrestrial) CU→(terrestrial) CU (of another gNB)→(GW)→neighbor satellite (with DU onboard);
- Serving satellite (with DU onboard)→(GW)→(terrestrial) CU (where the CU is responsible for broadcasting ephemeris data via another cell, possibly via another satellite);
- Serving satellite (with DU onboard)→(GW)→(terrestrial) CU→(terrestrial) CU (of another gNB) (where the CU is responsible for broadcasting ephemeris data via another cell, possibly via another satellite); and
- Serving satellite (with gNB onboard)→neighbor satellite (with gNB onboard).

If an acknowledgement (or negative acknowledgement) is sent to the requesting UE, this may be sent in a random access Msg2 in case the Msg1-based SI request method is used, or a random access Msg4 in case the Msg3-based SI request method is used, a MsgB in case the MsgA-based SI request method is used, or a dedicated RRC message in case a dedicated RRC message is used for the request (e.g. in RRC_CONNECTED state).

Figure 8:
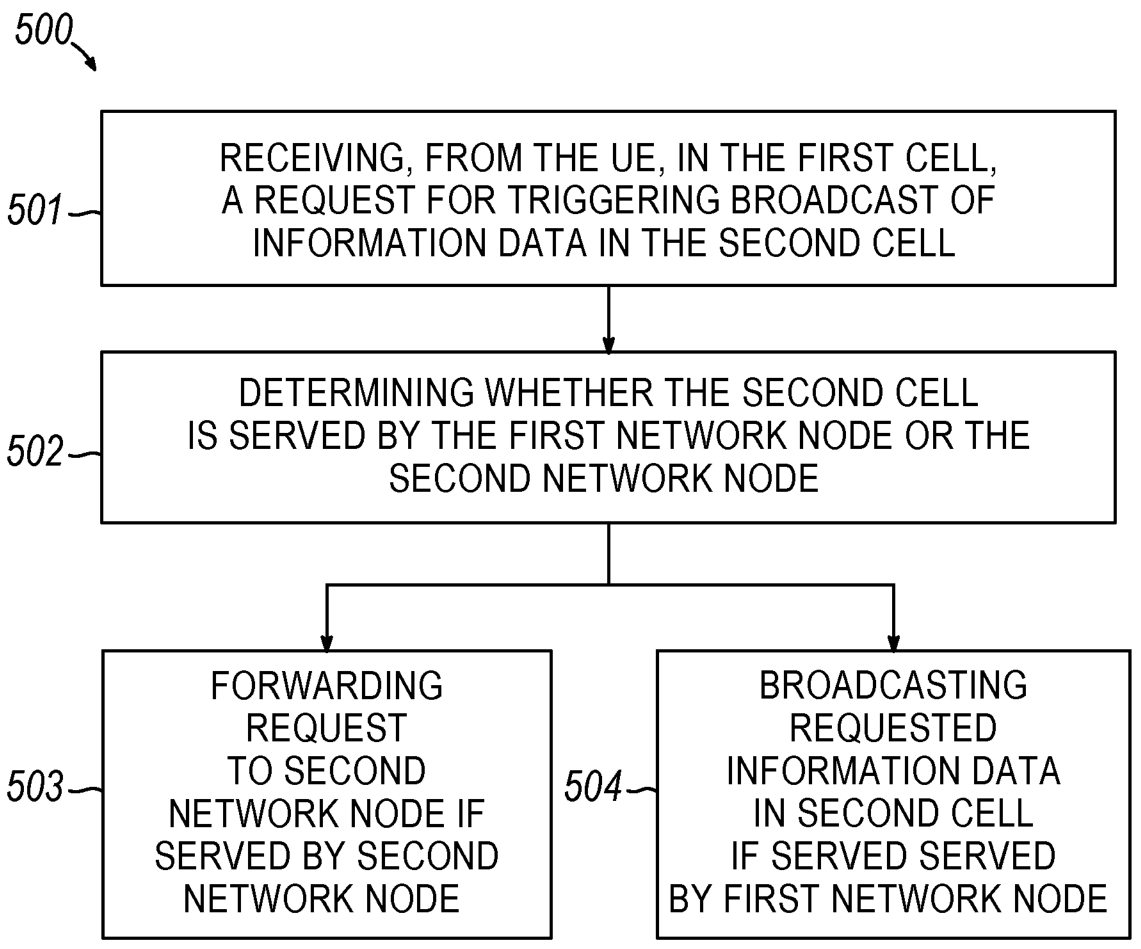
FIG. 8 shows a schematic flow chart of a method performed by a first network node for moving from a first cell to a second cell according to an embodiment of the present disclosure.

FIG. 8 shows a schematic flow chart of a method 500 performed by a first network node, for moving a UE from a first cell associated with the first network node to a second cell, wherein the first cell is a serving cell for the UE. In the method 500, the first cell is a serving cell of the UE and is controlled by the first network node, and the second cell is one of one or more neighbor cells controlled by a second network node. Method 500 includes the following steps 501-504.

At step 501, the first network node receives from the UE, in the first cell, a signal (e.g., a request) for triggering broadcast of information data in the second cell. In an example, before receiving the signal, the first network node may obtain configuration information related to an approach for the UE to request broadcast of the information data in one or more neighbor cells. Alternatively, before receiving the signal, the first network node may configure the UE, using system information broadcast in the first cell, with the information related to the approach for request of broadcast of the information data in one or more neighbor cells. In an example, e.g., when the UE is in RRC_IDLE or RRC_INACTIVE state, the first network node may receive the request prior to performing cell reselection to the second cell. In another example, e.g., when the UE is in RRC_CONNECTED state, the first network node may receive the request prior to executing a handover to the second cell.

At step 502, the first network node determines whether the second cell is served by the first network node or the second network node. In an example, if the second cell is served by the first network node, the first network node may determine whether to accept the request to broadcast the information data in the second cell. In an example, if the second cell is served by the second network node, the first network node may receive from the second network node a response message confirming or rejecting the request to broadcast the information data in the second cell. In an example, the first network node may transmit, to the UE, a response message confirming or rejecting the request to broadcast the information data in the second cell.

If the second cell is served by the second network node, the first network node forwards the request for broadcast of the information data to the second network node at step S503; and if the second cell is served by the first network node, the first network node broadcasts the requested information data in the second cell at step 504. In an example, the first network node may broadcast the requested information data in the second cell after a delay, at a designated time, one or more times within a time interval, or multiple times according to configuration information or the request from the UE. In an example, the first network node may broadcast, in the second cell, the satellite ephemeris data, together with "common timing advance" and/or "common Doppler shift" associated with a reference location in the second cell as described above.

Figure 9:
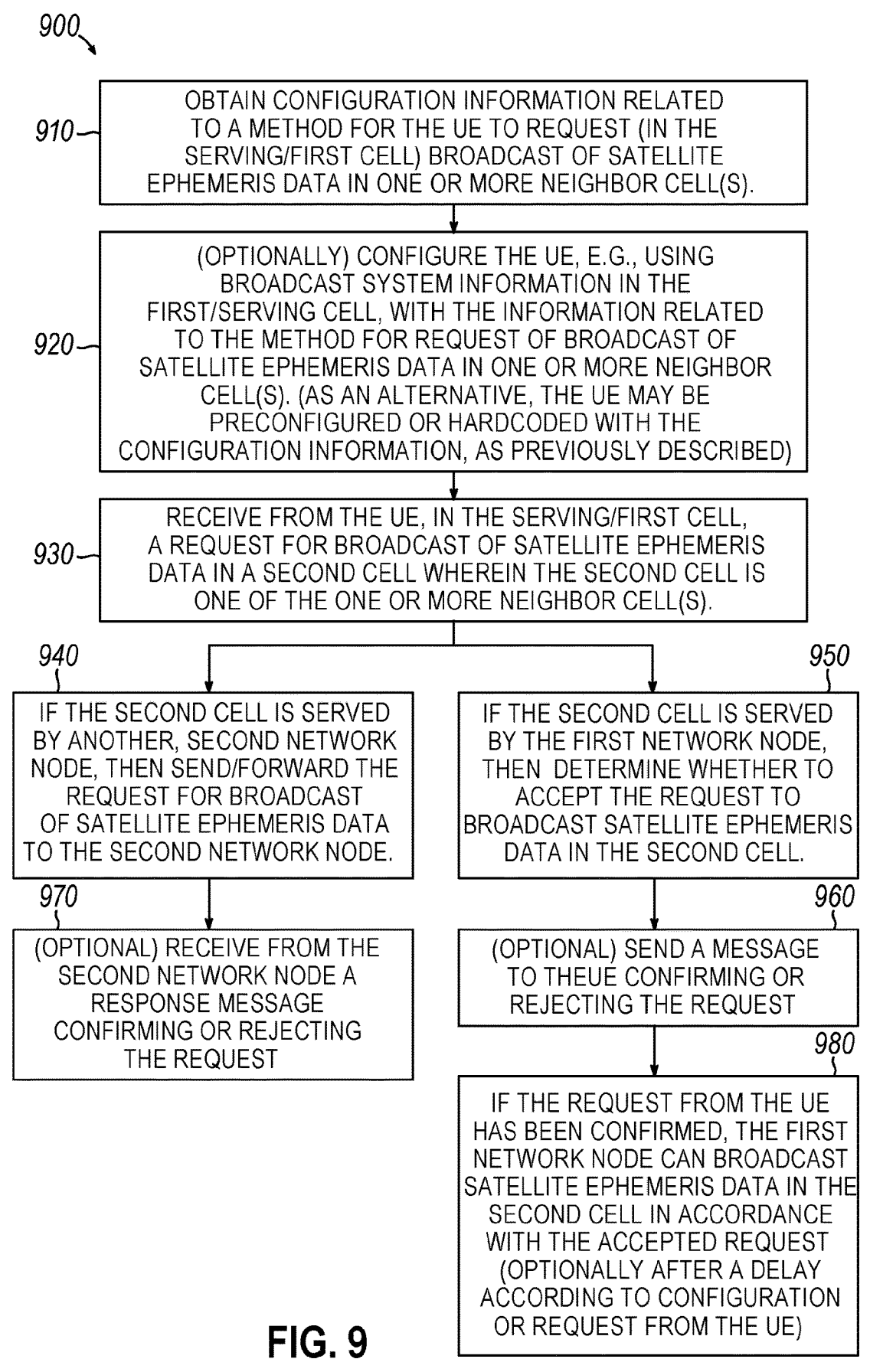

FIG. 9 displays a possible method embodiment 900 for a method performed by a first network node in a NTN, e.g., a gNB, serving a UE in (in RRC_IDLE, RRC_INACTIVE or RRC_CONNECTED state) in a serving cell (also called "a first cell") controlled by the first network node. Method 900 can be performed by a first network node for assisting a UE in moving from a first cell to a second cell. Step 910 is to obtain configuration information related to a method for the UE to request (in the serving/first cell) broadcast of satellite ephemeris data in one or more neighbor cell(s). Step 920 is to (optionally) configure the UE, e.g., using broadcast system information in the first/serving cell, with the information related to the method for request of broadcast of satellite ephemeris data in one or more neighbor cell(s). (As an alternative, the UE may be preconfigured or hardcoded with the configuration information, as previously described). Step 930 is to receive from the UE, in the serving/first cell, a request for broadcast of satellite ephemeris data in a second cell wherein the second cell is one of the one or more neighbor cell(s). At step 940, if the second cell is served by another, second network node, then send/forward the request for broadcast of satellite ephemeris data to the second network node. Optionally, at 970, the first network node can receive from the second network node a response message confirming (acknowledgement) or rejecting (negative acknowledgement) the request to broadcast satellite ephemeris data in the second cell. At step 950, if the second cell is served by the first network node, then determine whether to accept the request to broadcast satellite ephemeris data in the second cell. Optionally, at step 960, the first network node can send to the UE a response message confirming (acknowledgement) or rejecting (negative acknowledgement) the request to broadcast satellite ephemeris data in the second cell (in accordance with the optional response received from the second network node or the determination made in step 950). At step 980, if the request from the UE has been accepted, the first network node can broadcast satellite ephemeris data in the second cell in accordance with the accepted request (optionally after a delay according to configuration or request from the UE). Note that "obtain" in step 910 above may comprise receiving information from the O&M system, or from a core network node, or from a field technician, or configuration during manufacturing or customer adaptation, or as hardcoded information created during programming or product design.

Figure 10:
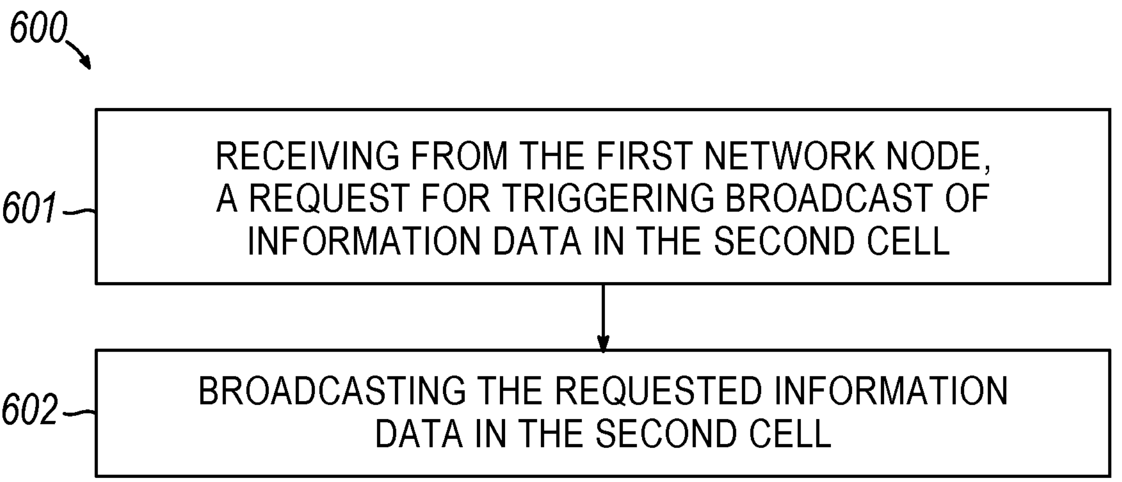
FIG. 10 shows a schematic flow chart of a method performed by a second network node for moving from a first cell to a second cell according to an embodiment of the present disclosure.

FIG. 10 shows a schematic flow chart of a method 600 performed by a second network node for moving a UE from a first cell to a second cell according to an embodiment of the present disclosure. In the method 600, the first cell is a serving cell of the UE and is controlled by a first network node, and the second cell is one of one or more neighbor cells controlled by the second network node. Method 600 includes the following steps 601-602. At step 601, the second network node receives, from the first network node, a request for triggering broadcast information data in the second cell. Optionally, the second network node may determine whether to accept the request to broadcast the information data in the second cell. Accordingly, the second network node may transmit, to the first network node, a response message confirming or rejecting the request to broadcast the information data in the second cell. At step 602 (optional in some embodiments), the second network node broadcasts the requested information data in the second cell. In an example, the second network node may broadcast the requested information data in the second cell after a delay, at a designated time, one or more times within a time interval, or multiple times according to configuration information or the received request. In an example, the second network node may broadcast, in the second cell, satellite ephemeris data, together with "common timing advance" and/or "common Doppler shift" associated with a reference location in the second cell as described above.

Figure 11:
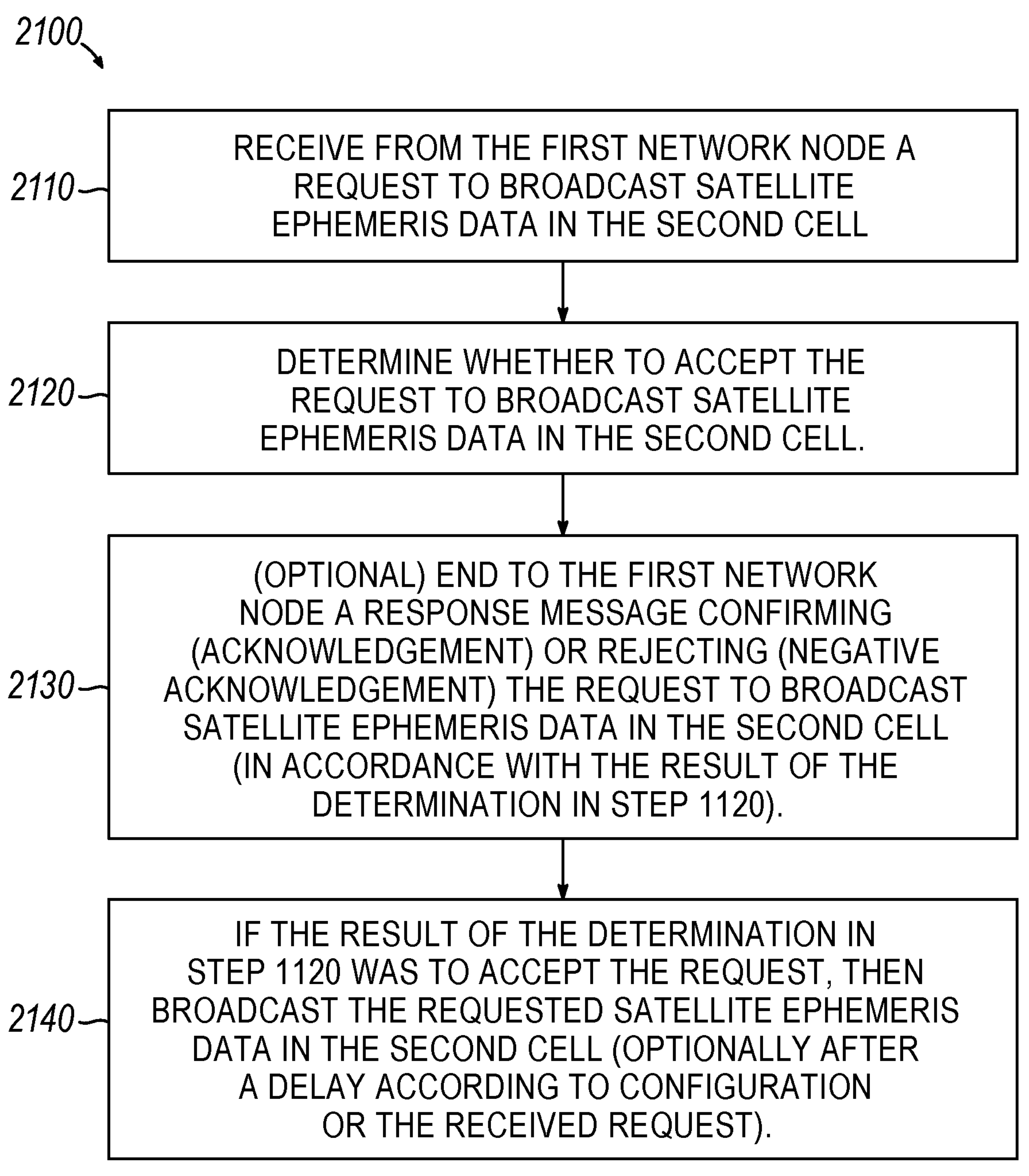
FIG. 11 shows a schematic flow chart of a method performed by a second network node for moving from a first cell to a second cell according to an embodiment of the present disclosure.

FIG. 11 shows a possible method 2100 performed by a second network node in a NTN, e.g., a gNB, neighboring a first network node serving a UE in (in RRC_IDLE, RRC_INACTIVE or RRC_CONNECTED state) in a serving cell (also called "a first cell") controlled by the first network node, wherein the second network node serves at least one second cell neighboring the UE's serving/first cell. Step 2110 is to receive from the first network node a request to broadcast satellite ephemeris data in the second cell. Step 2120 is to determine whether to accept the request to broadcast satellite ephemeris data in the second cell. Optionally, at step 2130, the second network node can send to the first network node a response message confirming (acknowledgement) or rejecting (negative acknowledgement) the request to broadcast satellite ephemeris data in the second cell (in accordance with the result of the determination in step 2120). At 2140, if the result of the determination in step 2120 was to accept the request, then the second network node can broadcast the requested satellite ephemeris data in the second cell (optionally after a delay according to configuration or the received request).

In all the above embodiment variants, the broadcast satellite ephemeris data (i.e., the orbital and position/velocity information) may be complemented by information about the satellite's feeder link, such as the feeder link propagation (or roundtrip) delay and/or feeder link Doppler shift, and/or information about the GW, e.g. the GW location, and/or information about the gNB (on the ground, i.e. in the transparent payload architecture), e.g., the gNB location, and/or information about the GW-gNB link (if any), e.g. the GW-gNB propagation (or roundtrip) delay, information about the GW-CU link (if any), e.g. the GW-CU propagation (or roundtrip) delay, etc. Furthermore, if a method for supporting a UE's calculation of a pre-compensating timing advance and/or Doppler shift frequency pre-compensation in the concerned neighbor cell is based on timing and/or frequency related information associated with a reference location, e.g. a center location of the neighbor cell, then this reference location and preferably its associated timing and/or frequency related information, such as a "common timing advance" and/or a "common Doppler shift", may be broadcast together with the ephemeris data in the neighbor cell, either by default, as stipulated by standard specification(s), or upon indication in the request transmitted by the UE (and forwarded to the gNB associated with the satellite serving the concerned neighbor cell). This can facilitate for the UE to calculate residual timing and/or frequency compensation to arrive at an accurate pre-compensating timing advance and/or an accurate pre-compensating frequency shift (e.g., to compensate for Doppler shift).

Although the above-described embodiments focus on the scenario where a UE wants ephemeris data to be broadcast in a cell to which it is moving, embodiments under the present disclosure may be applied for other information, e.g., other types of information or system information or other parts of the system information. An example may be access related information, e.g., if a resource saving scheme is applied and this information is infrequently broadcast, or only available on-demand, on a regular basis, in which case a request prior to entering the cell is beneficial and speeds up the access procedure in the new cell. Another example may be an accurate timestamp, which the UE may use (together with a time reference retrieved from Global Navigation Satellite System (GNSS) (e.g., Global Position System, GPS) satellite(s)) to calculate a pre-compensation timing advance (and/or a pre-compensating frequency shift, e.g., to compensate for Doppler shift) to be used in the new cell.

The above embodiments are described in terms of a UE being served in a cell in a NTN. However, the proposed solution is applicable also in scenarios where the UE is served in a cell in a terrestrial network, e.g., a cellular network employing the Radio Access Technologies (RATs) NR or LTE. In such a scenario, the UE may be about to switch (through cell reselection or handover) to a cell in a NTN, wherein the proposed solution may be applied. Furthermore, the proposed solution may be applicable also when both the serving cell and the concerned neighbor cell are served by a terrestrial network, although in that scenario the information requested to be broadcast in the neighbor cell will be of another type than satellite ephemeris data. Yet an additional scenario where embodiments of the present disclosure can be applied is when the UE is served in a cell in a NTN and the concerned neighbor cell belongs to terrestrial network. In summary, the proposed solution can be applied in scenarios with any combination of network type (i.e. terrestrial network or NTN) for the involved cells (i.e., the serving cell and the neighbor cell), with the restriction that in scenarios where the concerned neighbor cell belongs to a terrestrial network, the option to request broadcast of satellite ephemeris data in the neighbor cell is not applicable and the information requested to be broadcast is instead of another type, e.g., system information related to access configurations or access restrictions in the concerned neighbor cell.

Figure 12:
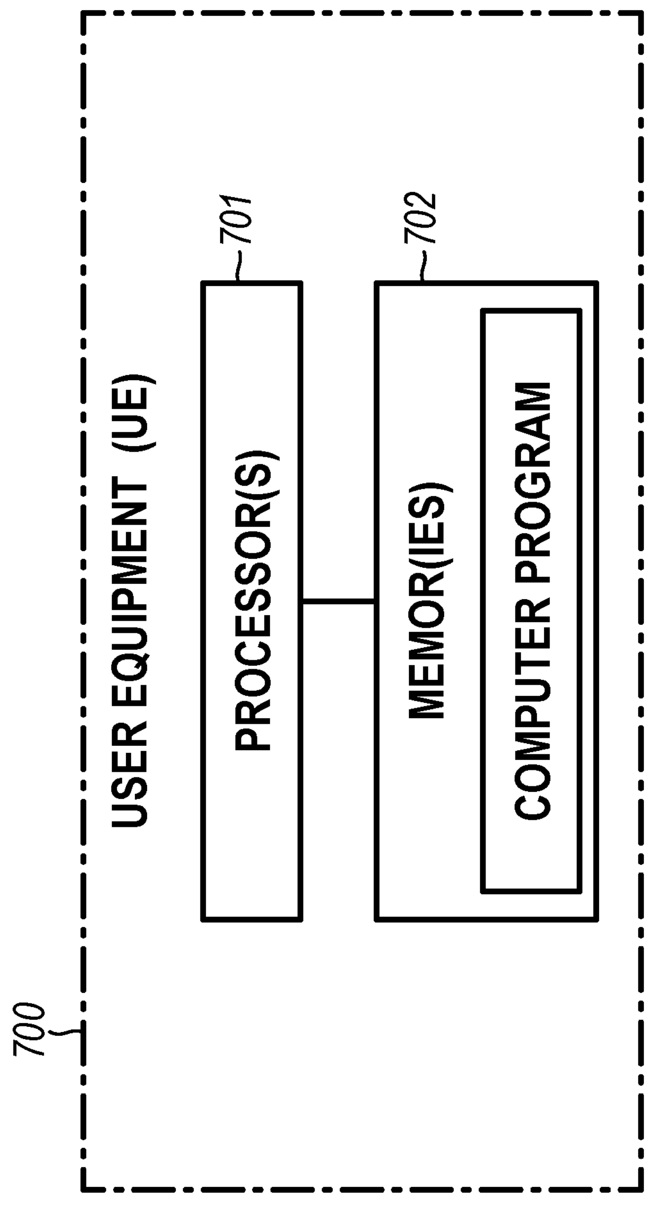
FIGS. 12-14 show schematic block diagrams of a UE, a first network node and a second network node respectively according to embodiments of the present disclosure.
Figure 13:
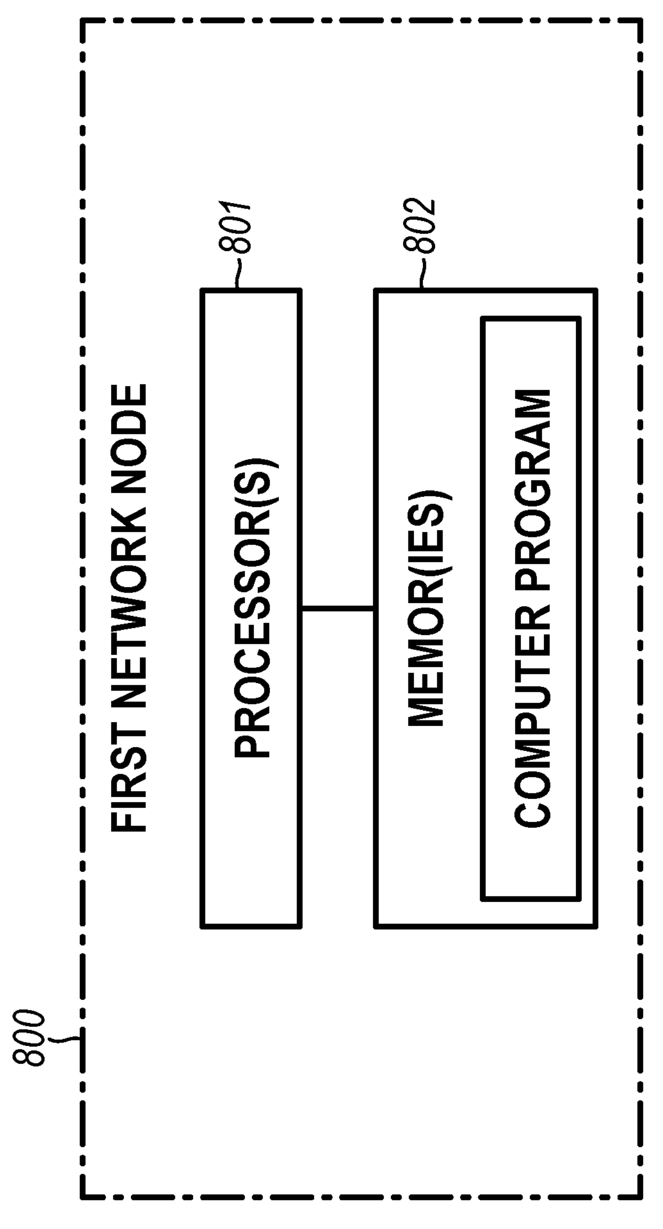
Figure 14:
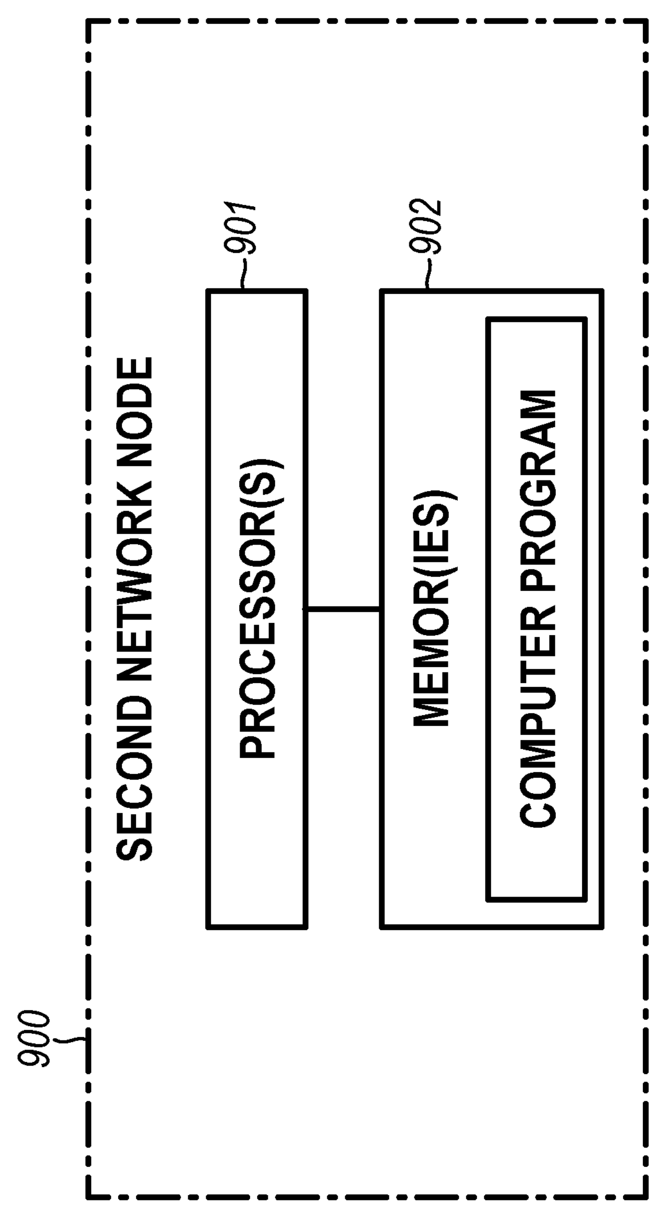

FIGS. 12-14 show schematic block diagrams of a UE 700, a first network node 800 and a second network node 900 respectively according to embodiments of the present disclosure.

The UE 700, the first network node 800 and the second network 900 each may include at least a processor 701, 801, 901 and at least a memory 702, 802, 902, as shown in FIGS. 12-14. As shown in FIG. 12, the memory 702 has stored thereon a computer program which, when executed on the processor 701, causes the processor 701 to carry out any of the methods performed in the UE 700 according to the present disclosure. As shown in FIG. 13, the memory 802 has stored thereon a computer program which, when executed on the processor 801, causes the processor 801 to carry out any of the methods performed in the first network node 800 according to the present disclosure. As shown in FIG. 14, the memory 902 has stored thereon a computer program which, when executed on the processor 901, causes the processor 901 to carry out any of the methods performed in the first network node 900 according to the present disclosure.

The memory may be, e.g., an Electrically Erasable Programmable Read-Only Memory (EEPROM), a flash memory and a hard drive. The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules could in alternative embodiments be distributed on different computer program products in the form of memories within the UE or the network nodes.

In an embodiment of the present disclosure, there is provided a computer-readable storage medium having stored thereon a computer program which, when executed on at least one processor, causes the at least one processor to carry out the method according to the present disclosure.

According to embodiments of the present disclosure, a UE, by transmitting a signal in its serving cell, can trigger broadcast of system information or satellite ephemeris data in another cell. In a preferred embodiment, the signal may be a PRACH preamble configured to be dedicated for this purpose, possibly in combination with certain PRACH transmission resources. In one typical embodiment, the UE may be in RRC_IDLE or RRC_INACTIVE state and sends such a signal prior to performing cell reselection to the concerned other cell. In another embodiment, the UE may be in RRC_CONNECTED state and sends the signal prior to executing a handover to the concerned other cell (e.g., a conditional handover).

Figure 15:
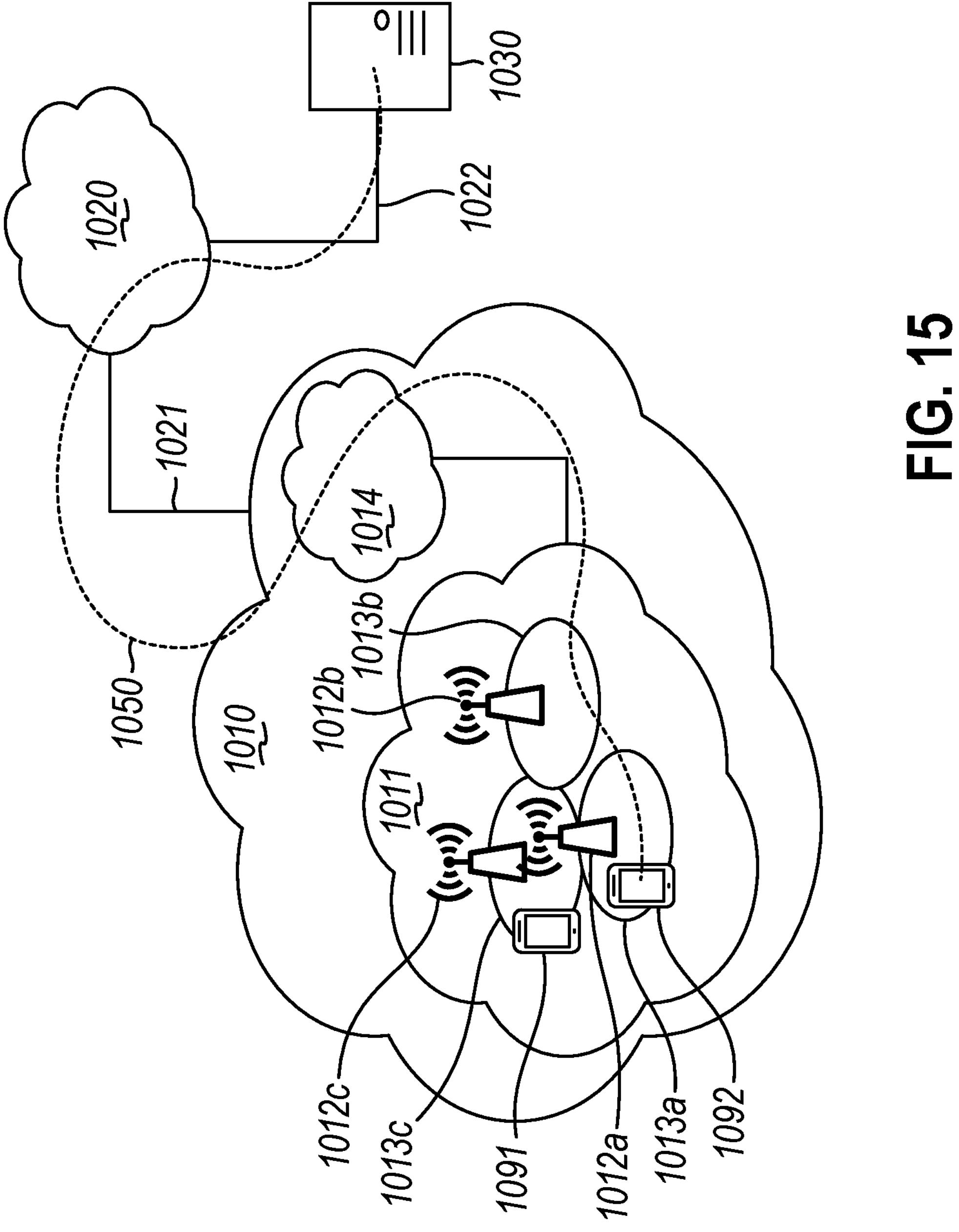
FIG. 15 schematically illustrates a telecommunication network connected via an intermediate network to a host computer.

FIG. 15 schematically illustrates a telecommunication network connected via an intermediate network to a host computer.

With reference to FIG. 15, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to the core network 1014 over a wired or wireless connection 1015. A first user equipment (UE) 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

UEs 1091, 1092 can be moving from one coverage area 1013*a*, 1013*b*, 1013*c* to another, and may need to trigger the sending of ephemeris or other data in a neighboring cell to which the UE is moving. Methods of triggering the sending of data can be practiced by a first base station (for example 1012*a*), a second base station (for example 1012*b*), or a UE (for example 1092), in the various embodiments described herein.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 15 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Figure 16:
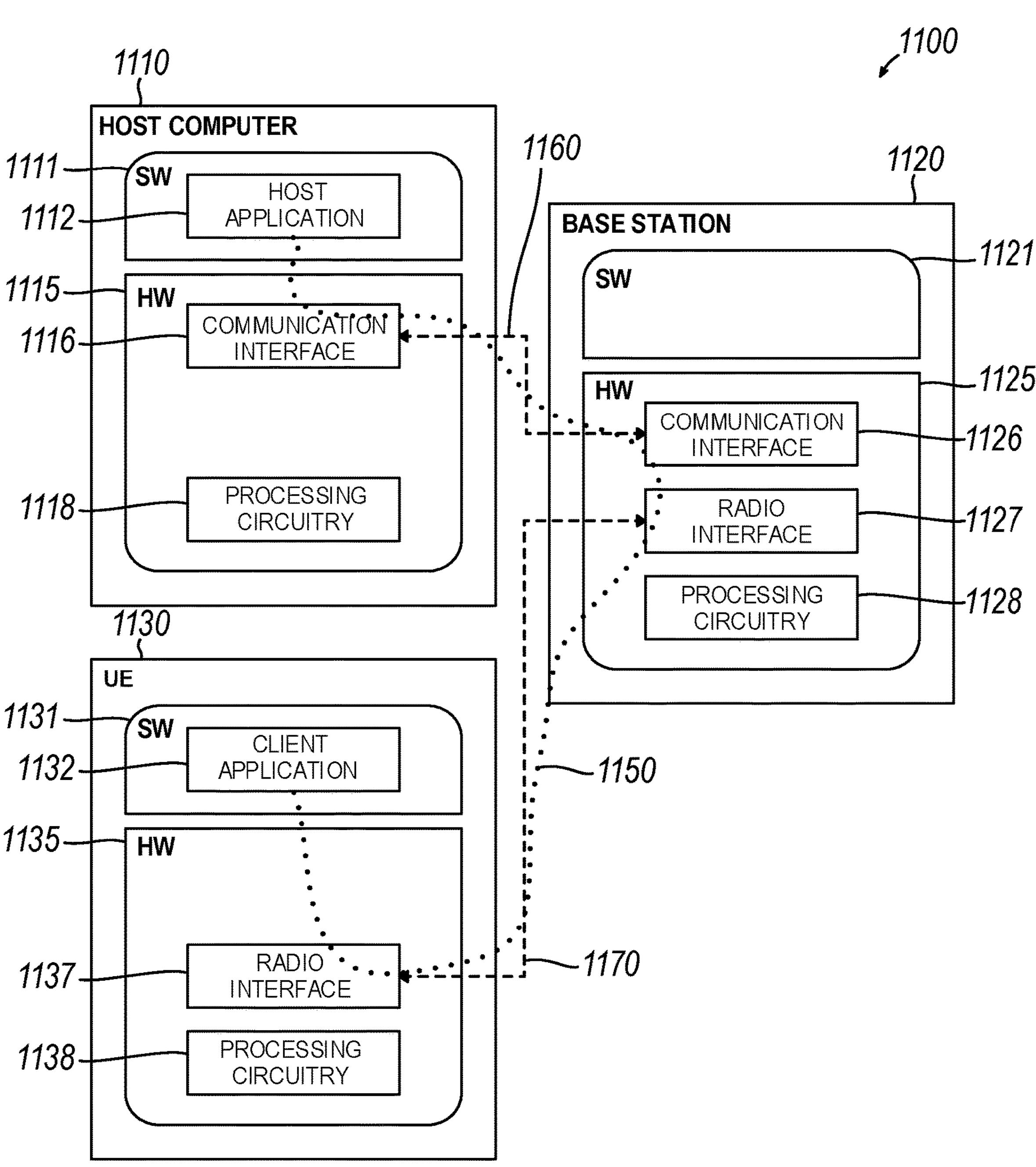
FIG. 16 is a generalized block diagram of a host computer communicating via a base station with a user equipment over a partially wireless connection.

FIG. 16 is a generalized block diagram of a host computer communicating via a base station with a user equipment over a partially wireless connection. Example implementations, in accordance with an embodiment, of the UE, base station and host computer discussed in the preceding paragraphs will now be described with reference to FIG. 16. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 16) served by the base station 1120. The communication interface 1126 may be configured to facilitate a connection 1160 to the host computer 1110. The connection 1160 may be direct or it may pass through a core network (not shown in FIG. 16) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

It is noted that the host computer 1110, base station 1120 and UE 1130 illustrated in FIG. 16 may be identical to the host computer 3230, one of the base stations 3212*a*, 3212*b*, 3212*c* and one of the UEs 3291, 3292 of FIG. 15, respectively. This is to say, the inner workings of these entities may be as shown in FIG. 16 and independently, the surrounding network topology may be that of FIG. 15. In FIG. 16, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network). The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the latency and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

Figures 17, 18:
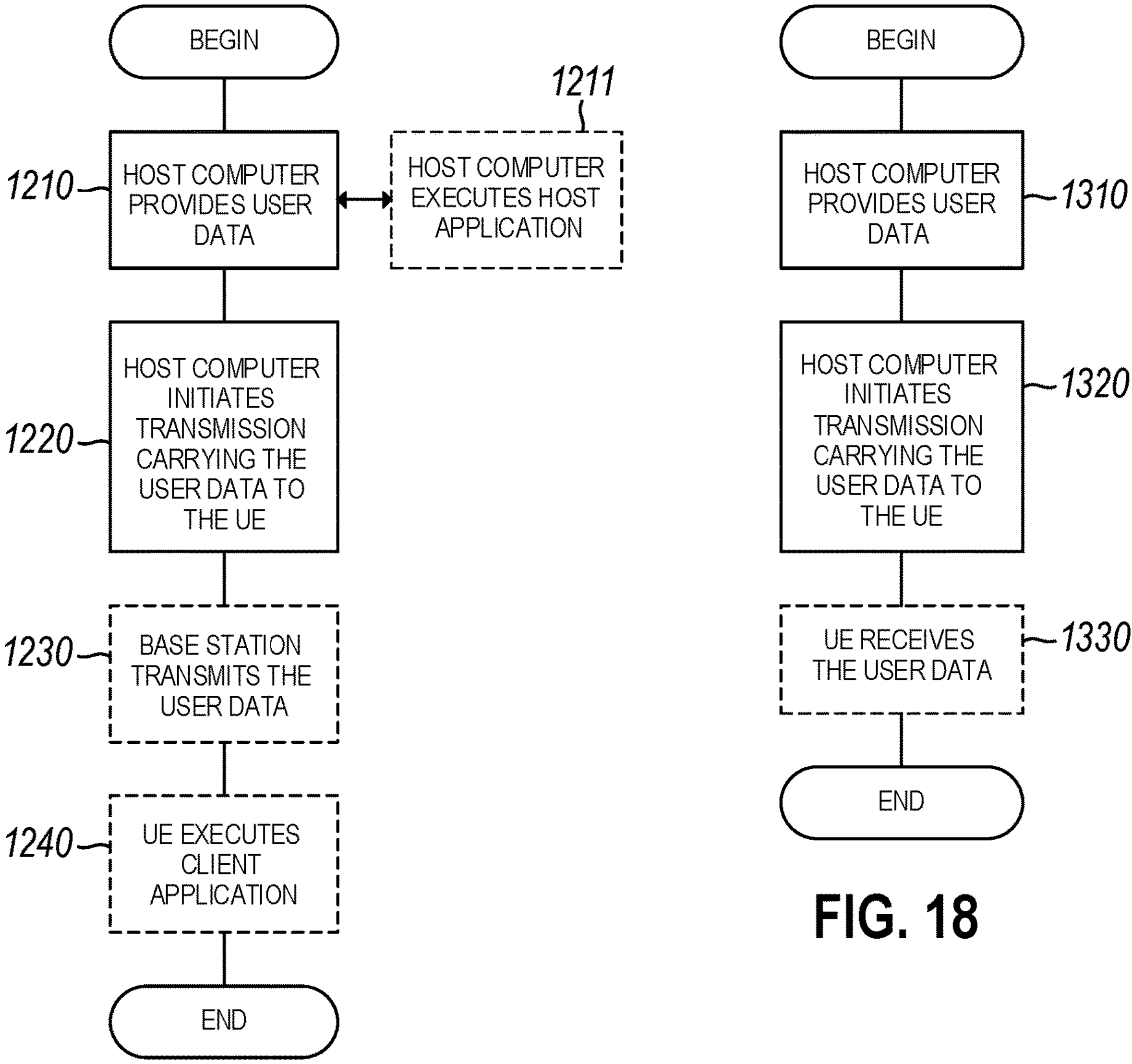
FIGS. 17 to 20 are flowcharts illustrating methods implemented in a communication system including a host computer, a base station, and a user equipment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

Figures 19, 20:
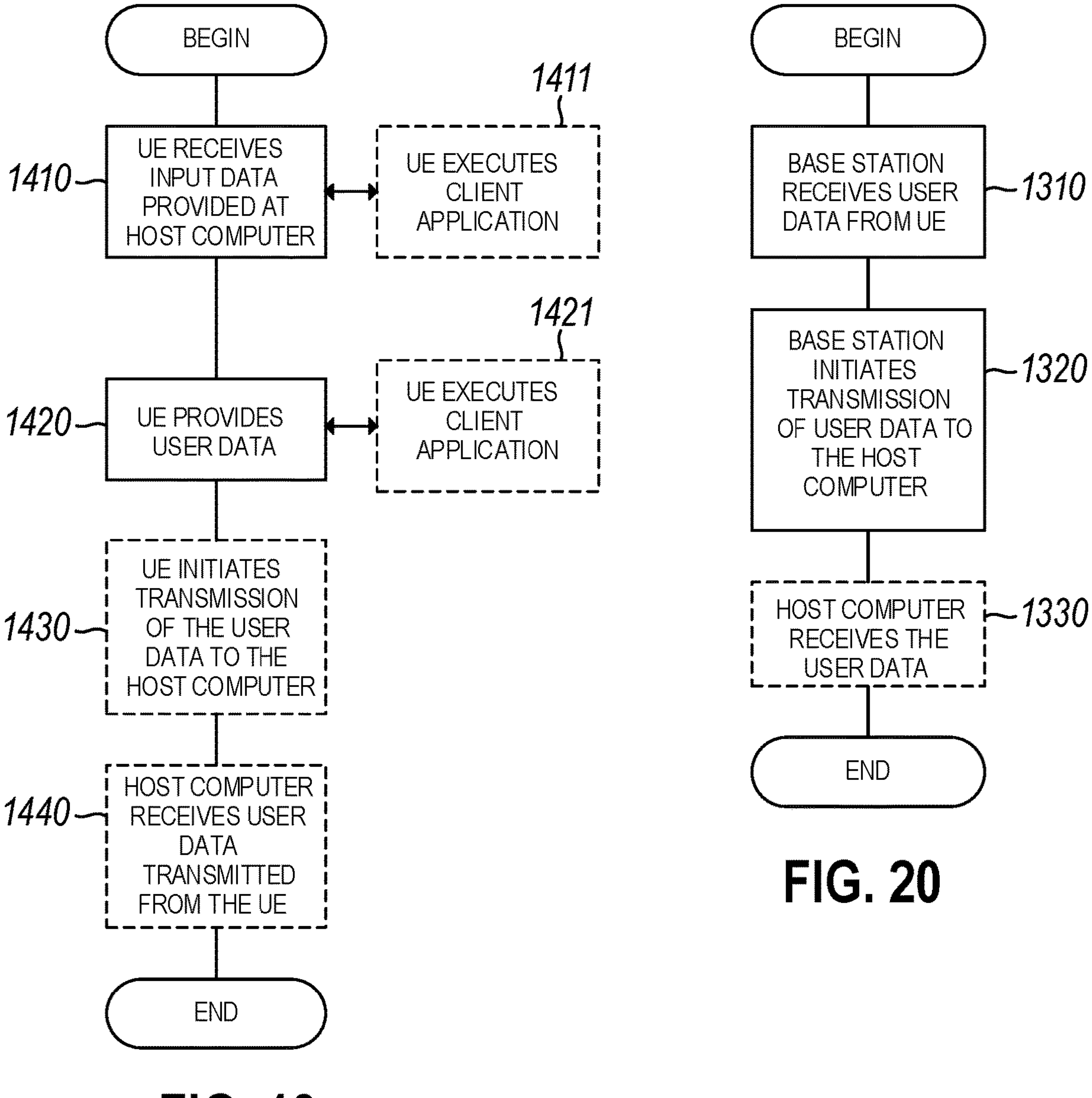

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Computer Systems of the Present Disclosure

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

In an embodiment, the communication system may include a complex of computing devices executing any of the method of the embodiments as described above and data storage devices which could be server parks and data centers.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In general, the various exemplary embodiments may be implemented in hardware or special purpose chips, circuits, software, logic, or any combination thereof. For example, some aspects may be implemented in hardware, while other aspects may be implemented in firmware or software which may be executed by a controller, microprocessor, or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality or functionalities. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by wired data links, wireless data links, or by a combination of wired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS").

The cloud-computing model may also be deployed using different deployment models such as private cloud, community cloud, public cloud, hybrid cloud, and so forth.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed embodiments.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The following abbreviations are used in the present disclosure:

3GPP 3rd Generation Partnership Project
BS Base Station
BWP Bandwidth Part
CMAS Commercial Mobile Alert System
CRC Cyclic Redundancy Check
CU Central Unit
DCI Downlink Control Information
DRX Discontinuous Reception
DU Distributed Unit
ETWS Earthquake and Tsunami Warning System
GEO Geostationary Orbit
gNB Radio base station in NR (including NR NTN).
GW Gateway
ID Identity/Identifier
IE Information Element
LEO Low Earth Orbit
LTE Long Term Evolution
MAC Medium Access Control
MEO Medium Earth Orbit
MO Measurement Object
Msg Message
NR New Radio
NTN Non-Terrestrial Network
O&M Operation and Maintenance
PBCH Physical Broadcast Channel
PLMN Public Land Mobile Network
PO Paging Occasion
PRACH Physical Random Access Channel
P-RNTI Paging RNTI
PUSCH Physical Uplink Shared Channel
RA Random Access
RACH Random Access Channel
RAT Radio Access Technology
RNTI Radio Network Temporary Identity
RRC Radio Resource Control
SI System Information
SIB System Information Block
SS Synchronization Signal
SSB Synchronization Signal Block (Also referred to as SS/PBCH Block.)
TA Timing Advance
TAI Tracking Area Identity
TLE Two-Line Element set TR Technical Report
TS Technical Specification
UE User Equipment
WI Work Item
Xn The interface between two gNBs in NR (including NR NTN).

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method performed by a user equipment (UE), for moving from a first cell to a second cell, wherein the first cell is a serving cell of the UE, and the second cell comprises one of one or more neighbor cells, the method comprising:
- transmitting to a base station associated with the first cell, while being served in the first cell, a request for triggering a broadcast of information data in the second cell according to configuration information prior to moving from the first cell to the second cell;
- receiving the information data broadcast by a second base station associated with the second cell; and
- calculating, by using the received information data, at least one of time and frequency pre-compensation to be applied to an uplink transmission in the second cell.

2. The method of claim 1, further comprising obtaining, from the base station associated with the first cell, the configuration information for the request for the broadcast of the information data in one or more neighbor cells.

3. The method of claim 1, wherein the transmitting a request comprises at least one of:
- transmitting the request prior to performing cell reselection to the second cell; or
- transmitting the request prior to executing a handover to the second cell.

4. The method of claim 1, further comprising:
- receiving a response message confirming or rejecting the request; and if the response message confirming the request is received, monitoring the information data from the downlink transmissions in the second cell.

5. The method of claim 1, wherein the information data comprises satellite ephemeris data broadcast via system information.

6. The method of claim 2, wherein the request for the broadcast of the information data in one or more neighbor cells comprises at least one of: a system information request, an ephemeris data request using a random-access preamble or a message related to a random-access procedure, a random access Msg3, a 2-step random access MsgA, and a dedicated RRC message request.

7. The method of claim 6, wherein the system information request includes at least one of:

an Msg1 based system information request for triggering broadcast of information data in the second cell;

an Msg3 based request for triggering broadcast of information data in the second cell; and a 2-step random access-based request for triggering broadcast of information data in the second cell.

8. A method performed by a first network node, for moving a user equipment (UE) from a first cell associated with the first network node to a second cell, wherein the first cell is a serving cell for the UE, the method comprising:

receiving from the UE, in the first cell, a request for triggering broadcast of information data in the second cell;

determining whether the second cell is served by the first network node or a second network node; and if the second cell is served by the second network node, forwarding the request for broadcast of the information data to the second network node; and if the second cell is served by the first network node, broadcasting, by the first network node, the requested information data in the second cell.

9. The method of claim 8, further comprising at least one of:

obtaining configuration information related to an approach for the UE to request broadcast of the information data in one or more neighbor cells; and configuring the UE, using broadcast system information in the first cell, with the information related to the approach for request of broadcast of the information data in the one or more neighbor cells.

10. The method of claim 8, wherein receiving a request comprises at least one of:

receiving the request prior to the UE performing cell reselection to the second cell; and receiving the request prior to the UE executing a handover to the second cell.

11. The method of claim 8, further comprising determining, if the second cell is served by the first network node, determining whether to accept the request to broadcast the information data in the second cell.

12. The method of claim 8, further comprising receiving from the second network node, if the second cell is served by the second network node, a response message confirming or rejecting the request to broadcast the information data in the second cell.

13. The method of claim 11, further comprising transmitting, to the UE, a response message confirming or rejecting the request to broadcast the information data in the second cell.

14. The method of claim 8, wherein broadcasting the requested information data in the second cell comprises broadcasting one or more of:

after a delay;

at a designated time;

one or more times within a time interval; or a number of repetitions;

according to configuration information or the request from the UE.

15. A second network node of a non-terrestrial network comprising:

a processor; and a memory having stored thereon a computer program which, when executed on the processor, causes the processor to carry out a method for moving a user equipment (UE) from a first cell to a second cell associated with the second network node, wherein the first cell is a serving cell of the UE and is controlled by a first network node, wherein the second cell comprises one of one or more neighbor cells of the first cell, the method comprising:

receiving, from the first network node, a request for triggering broadcast information data in the second cell, wherein the information data comprises satellite ephemeris data broadcast via system information, and wherein the satellite ephemeris data comprises:

orbital, position and velocity information of a satellite, and information about inter-node propagation path, wherein the information about inter-node propagation path comprises feeder link propagation delay and feeder link Doppler shift, where the feeder link is the communication link between the satellite and a gateway of the non-terrestrial network.

16. The second network node of claim 15, the method further comprising broadcasting the requested information data in the second cell.

17. The second network node of claim 15, the method further comprising determining whether to accept the request to broadcast the information data in the second cell.

18. The second network node of claim 15, the method further comprising transmitting, to the first network node, a response message confirming or rejecting the request to broadcast the information data in the second cell.

* * * * *